(12) United States Patent
Iwami

(10) Patent No.: US 10,055,832 B2
(45) Date of Patent: Aug. 21, 2018

(54) CONDUCTIVE FILM, DISPLAY DEVICE HAVING THE SAME, AND METHOD OF EVALUATING CONDUCTIVE FILM

(71) Applicant: FUJIFILM Corporation, Tokyo (JP)

(72) Inventor: Kazuchika Iwami, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/487,568

(22) Filed: Apr. 14, 2017

(65) Prior Publication Data

US 2017/0221195 A1 Aug. 3, 2017

Related U.S. Application Data

(63) Continuation of application No. PCT/JP2015/079004, filed on Oct. 14, 2015.

(30) Foreign Application Priority Data

Oct. 15, 2014 (JP) ................................. 2014-211018

(51) Int. Cl.
  *G06F 3/045* (2006.01)
  *G06K 9/00* (2006.01)
  (Continued)

(52) U.S. Cl.
  CPC ............ *G06T 7/0004* (2013.01); *G06F 3/044* (2013.01); *G06T 7/90* (2017.01);
  (Continued)

(58) Field of Classification Search
  CPC ..................... G06T 7/0004; G06T 7/90; G06T 2207/10056; G06T 2207/30121;
  (Continued)

(56) References Cited

U.S. PATENT DOCUMENTS

2011/0102361 A1* 5/2011 Philipp .................. G06F 3/044
  345/174
2013/0028503 A1* 1/2013 Wakui .................. H05K 9/0086
  382/141

(Continued)

FOREIGN PATENT DOCUMENTS

JP  2013-214545 A  10/2013
WO  2014/123009 A1  8/2014

OTHER PUBLICATIONS

International Search Report of PCT/JP2015/079004, dated Jan. 12, 2016. [PCT/ISA/210].

(Continued)

*Primary Examiner* — Amit Chatly
(74) *Attorney, Agent, or Firm* — Sughrue Mion, PLLC

(57) ABSTRACT

In the conductive film, a plurality of thin metal lines has a wavy wiring pattern in which a plurality of thin metal lines is formed as wavy lines, of which amplitudes are equal to or less than an amplitude threshold value, so as to have irregularity. The plurality of thin metal lines constitutes a typical wiring pattern which allows an indicator of evaluation of moirés to be equal to or less than an evaluation threshold value. Here, from at least one point of view, in frequencies and intensities of moirés each calculated for each color from first and second peak frequencies and first and second peak intensities of 2DFFT spectra of transmittance image data of a regular polygonal wiring pattern and luminance image data of a pixel array pattern of each color at the time of lighting up for each single color, the indicator of evaluation of moiré is calculated from evaluation values of moirés of the respective colors obtained by applying human visual response characteristics in accordance with an observation distance to intensities of the moirés equal to or greater than an intensity threshold value among intensities of (Continued)

the moirés at frequencies of moirés equal to or less than a frequency threshold value.

28 Claims, 15 Drawing Sheets

(51) Int. Cl.
    *G06T 7/00*         (2017.01)
    *G06F 3/044*       (2006.01)
    *G06T 7/90*         (2017.01)

(52) U.S. Cl.
    CPC ............... *G06F 2203/04112* (2013.01); *G06T 2207/10024* (2013.01); *G06T 2207/10056* (2013.01); *G06T 2207/30121* (2013.01)

(58) Field of Classification Search
    CPC ........... G06T 2207/10024; G06F 3/044; G06F 2203/04112
    USPC .......................................... 345/173–178; 1/1
    See application file for complete search history.

(56) References Cited

U.S. PATENT DOCUMENTS

2015/0015980 A1    1/2015    Iwami
2015/0342034 A1   11/2015   Iwami

OTHER PUBLICATIONS

Written Opinion of PCT/JP2015/079004, dated Jan. 12, 2016. [PCT/ISA/237].
International Preliminary Report on Patentability and Translation of Written Opinion, dated Apr. 27, 2017, from the International Bureau in counterpart International application No. PCT/JP2015/079004.
Communication dated Sep. 11, 2017 from the European Patent Office in counterpart Application No. 15850128.8.

\* cited by examiner

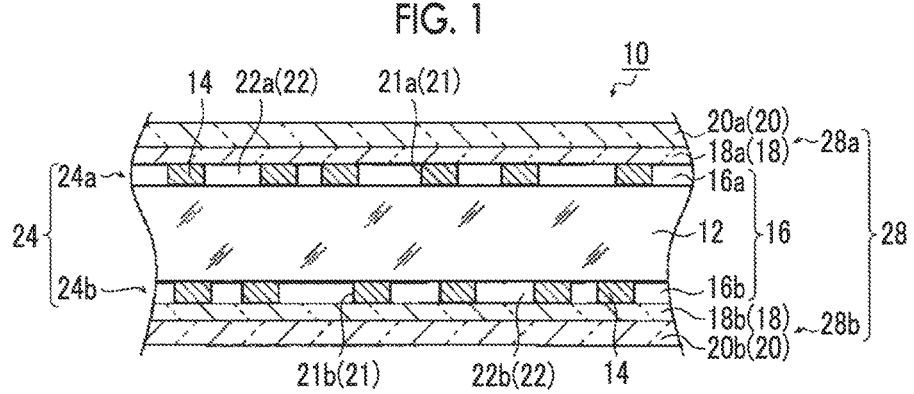
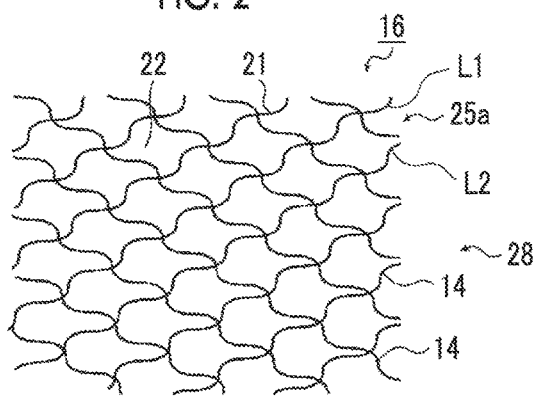
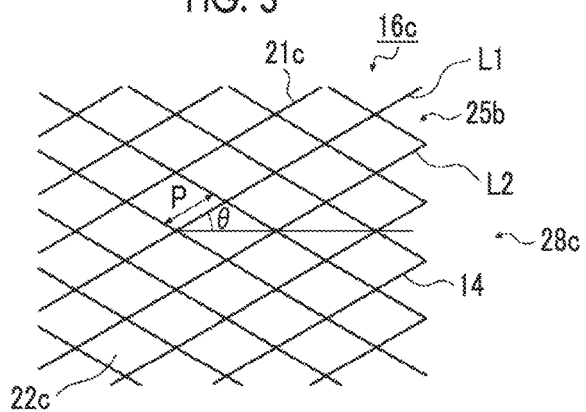

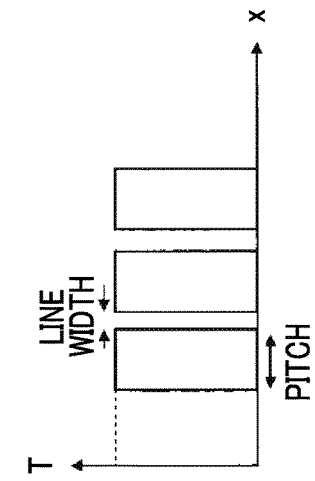
FIG. 11A
MESH PATTERN
FIG. 11C
PRESENT INVENTION
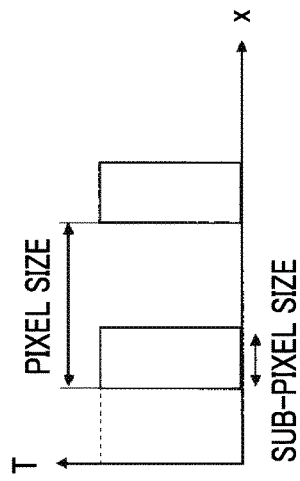
FIG. 11E
RELATED ART
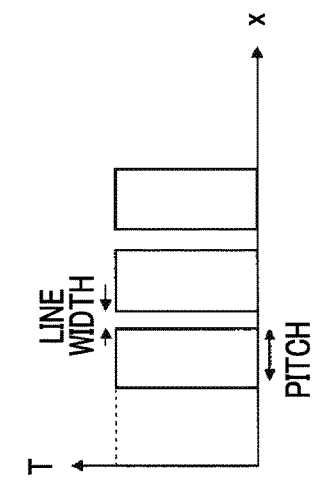
FIG. 11B
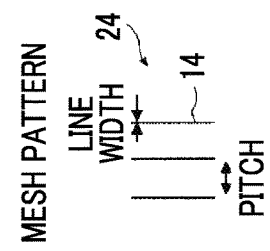
FIG. 11D
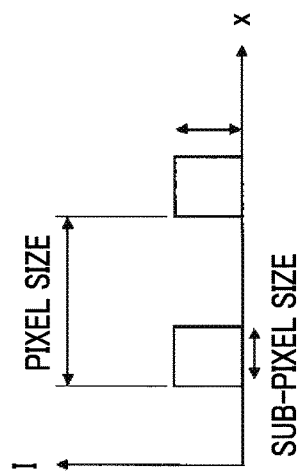
FIG. 11F
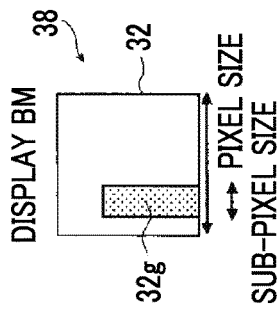

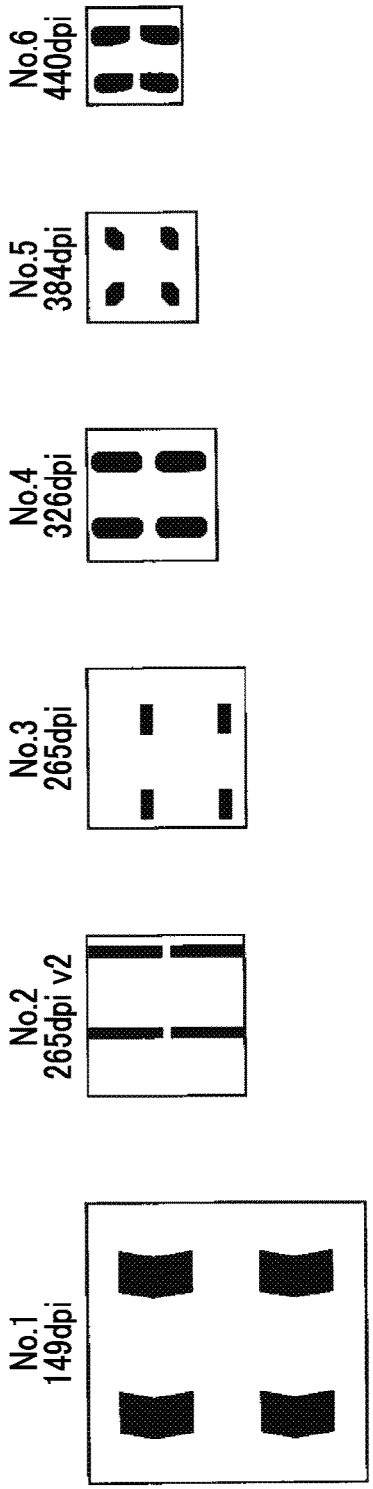

CAPTURED IMAGE

INPUT DATA

CONDUCTIVE FILM, DISPLAY DEVICE HAVING THE SAME, AND METHOD OF EVALUATING CONDUCTIVE FILM

CROSS-REFERENCE TO RELATED APPLICATIONS

This application is a Continuation of PCT International Application No. PCT/JP2015/079004 filed on Oct. 14, 2015, which claims priority under 35 U.S.C. § 119(a) to Japanese Patent Application No. 2014-211018 filed on Oct. 15, 2014. The above application is hereby expressly incorporated by reference, in its entirety, into the present application.

BACKGROUND OF THE INVENTION

1. Field of the Invention

The present invention relates to a conductive film, a display device having the same, and a method of evaluating the conductive film. Specifically, the invention relates to a conductive film that has a mesh-shaped wiring pattern capable of providing image quality which is improved in terms of visibility of moiré in accordance with an emission intensity of a display device even if the pattern overlaps with pixel array patterns of the display device having different emission intensities, a display device having the same, and a method of evaluating the conductive film.

2. Description of the Related Art

Examples of conductive films, each of which is provided on a display unit of a display device (hereinafter referred to as a display), include a conductive film for a touch panel having a conductive layer formed of thin metal lines which have a mesh-shaped wiring pattern (hereinafter referred to as a mesh pattern), a conductive film for an electromagnetic shield, and the like.

Regarding such conductive films, since there is a problem that a moiré caused by interference between a mesh pattern and a pixel array pattern (for example referred to as an array pattern of RGB color filters or a black matrix (hereinafter also referred to as a BM) pattern as a reverse pattern thereof) of a display may be visually perceived, various conductive films having a mesh pattern due to which a moiré is not visually perceived or unlikely to be visually perceived have been proposed (for example, refer to JP2013-214545A).

In a technology disclosed in JP2013-214545A according to the present application of the applicant, a rhomboid shape of a mesh pattern, which allows the sum of intensities of moirés within a predetermined frequency range in which the frequency of moiré is determined depending on visual response characteristics to be equal to or less than a predetermined value, is made to be irregular in accordance with widths of thin metal lines constituting the mesh pattern, with respect to frequencies and intensities of moirés obtained by applying human visual response characteristics to frequency information and intensity information of moiré s respectively calculated from peak frequencies and peak intensities of respective spectrum peaks of a two-dimensional Fourier (2DFFT) spectrum of transmittance image data of a rhomboid (diamond) mesh pattern of the conductive film and a two-dimensional Fourier (2DFFT) spectrum of transmittance image data of a pixel array (BM) pattern of the display. As a result, it is possible to suppress occurrence of moiré, and it is possible to improve visibility.

SUMMARY OF THE INVENTION

Meanwhile, in JP2013-214545A, moiré is quantified by performing convolution of the FFT spectrum of the rhomboid (diamond) mesh pattern and the FFT spectrum of the BM pattern of the display, and the pattern is made to be irregular. As a result, image quality is improved in terms of visibility of moiré.

However, in JP2013-214545A, the pixel array pattern of the display, which is used when moiré is predicted, is typified only by sub-pixels for just a single color, for example, a BM pattern of a G channel, and a luminance of the display is not considered. As a result, the Fourier spectrum of the BM pattern of the display depends on only spatial frequency characteristics of the sub-pixels for the single color, for example, the G channel. In a case where a different display is used, particularly the emission intensity is not considered, and thus there is no consistency in quantitative values. Accordingly, a problem arises in that, in accordance with a display, moiré is not sufficiently prevented from occurring and image quality cannot be improved in terms of visibility. As a result, there is a problem that the visibility of moiré of a different display cannot be sufficiently evaluated.

For example, it is not possible to simply compare a quantitative value of moiré, which is visually perceived in a case where a certain specific pattern is applied to a high resolution smartphone, with a quantitative value of moiré which is visually perceived in a case where a certain specific pattern is applied to a medium resolution laptop. The reason for this is that the respective displays have different emission intensities, moiré, which is visually perceived, is strong if the emission intensity is strong, and moiré, which is visually perceived, is weak if the emission intensity is weak.

Meanwhile, recently, for example, as typical pixels of an organic EL display (OELD: Organic Electro Luminescence Display), pixels having the characteristics in which it is not necessary for opening shapes of RGB color filters, that is, shapes of sub-pixels to be substantially the same; and phases thereof, that is, phases of repeated patterns and cycles thereof are arbitrary (random) have been used. In the pixels arbitrarily configured in such a manner, the visibility of moiré, which is visually perceived due to lamination of a conductive film having the mesh-shaped wiring pattern on the pixels of the display, is different in accordance with an array pattern and a shape (including a size) of each sub-pixel of RGB. Therefore, the visibility depends on the emission intensity of the display, but luminances of the array patterns of the respective sub-pixels are different. However, in the technology disclosed in JP2013-214545A, only spatial frequency characteristics of the pixel array pattern of G are considered, and thus there is a problem in that the moiré visibilities of the displays having different emission intensities and array patterns of the sub-pixels are not accurately evaluated, and moiré problems cannot be corrected.

That is, in each of the displays using pixels having various configurations and having various light intensities, in order to improve the visibility of moiré of the conductive film laminated on a display screen of the display, light intensities of RGB depending on the display are necessary, and it is necessary to consider all numerical values obtained by digitizing visibility of moiré for each of RGB. However, there is a problem in that the numerical values are not considered at all in JP2013-214545A.

In order to solve the problems of the related art, the present invention has an object to provide a conductive film, a display device having the same, and a method of evaluating patterns of the conductive film. The conductive film has a random (irregular) mesh-shaped wiring pattern (mesh pattern) capable of preventing moirés from occurring in accordance with the intensity of the display regardless of an observation distance and greatly improving visibility, even in a case where the pattern overlaps with the pixel array pattern of a display unit (display) having a different emission intensity (luminance).

In particular, the present invention also has an object to provide a conductive film, a display device having the same, and a method of evaluating patterns of the conductive film. The conductive film has a random mesh pattern in which the emission intensity of the display unit is considered, when the conductive film overlaps with a black matrix of a display unit of a display device having a different emission intensity and is visually perceived, in a case where the transparent conductive film having the mesh pattern is used as a touch panel electrode. The conductive film is able to suppress occurrence of moiré which greatly disturbs image quality, and is able to greatly improve visibility of the display on the touch panel.

Further, in addition to the above-mentioned object, another object of the present invention is to provide a conductive film, a display device having the same, and a method of evaluating the conductive film. Also in a design of a mesh pattern of the conductive film in a case where the opening shapes of the RGB sub-pixels of the display have frequencies and intensities (shapes and sizes) different from each other, the conductive film has a mesh pattern capable of providing best image quality in combination with the pixel array pattern of a display having a different emission intensity.

In order to achieve the above object, the inventors of the present invention have made extensive studies and, as a result, have found out the following and have reached the present invention.

Considering a process for improving image quality of a touch panel display device, as described in JP2014-135273A and JP2014-137386A relating to the present applicant's application, first, (diamond) mesh pattern is generated, and subsequently display BM data (including luminance) is generated, and then moiré is calculated. Here, in a case where the mesh pattern in the first mesh pattern generation causes moiré which is unlikely to be visually perceived by a level equal to or less than a specific threshold value, in order to further improve visibility, it is necessary to decrease the Fourier spectrum intensity of the mesh pattern. In the above-mentioned application, the peak intensity of the mesh pattern is attenuated by randomizing a mesh pitch, an angle, and the like, and randomizing a mesh itself, for example, cells itself. However, in order to decrease the peak intensity of the mesh pattern, it is preferable to make the periodicity of the mesh pattern slightly irregular, so that the mesh itself is not necessarily random. Accordingly, a quantitative value (indicator of evaluation) of moiré comparable to different displays is calculated, and the peak intensity is lowered such that blurring is performed by making a mesh pattern satisfying the threshold value or less wavy so as to make the mesh as random wavy lines. As a result, it is possible to provide a mesh pattern excellent in visibility.

That is, according to a first aspect of the present invention, a conductive film is provided on a display unit of a display device. The conductive film comprises: a transparent substrate; and two wiring portions that are respectively formed on both sides or a single side of the transparent substrate. At least one wiring portion of the two wiring portions has a plurality of thin metal lines. The plurality of thin metal lines of at least one wiring portion of the two wiring portions has a wiring pattern which is formed of wavy lines so as to have irregularity. The plurality of thin metal lines or center lines of the wavy lines have a polygonal wiring pattern formed in a mesh shape such that a plurality of polygonal opening portions is arranged on the wiring portion. In the display unit, pixels, which include a plurality of sub-pixels emitting light with a plurality of colors that are at least three colors different from each other, are arranged in pixel array patterns. The conductive film is provided on the display unit such that the wiring patterns of the two wiring portions overlap with the pixel array patterns of the display unit. From at least one point of view, a wiring pattern, which is not made to be irregular, is a polygonal wiring pattern formed such that an indicator of evaluation of moirés is equal to or less than an evaluation threshold value, where in frequencies and intensities of the moirés of respective colors of a plurality of colors calculated from a first peak frequency and a first peak intensity of a plurality of first spectrum peaks of two-dimensional Fourier spectra of transmittance image data of regular polygonal wiring patterns which are not made to be irregular and a second peak frequency and a second peak intensity of a plurality of second spectrum peaks of two-dimensional Fourier spectra of luminance image data of the pixel array patterns of the respective colors when light beams with the plurality of colors are respectively emitted, the indicator of evaluation is calculated from evaluation values of the moirés of the respective colors obtained by applying human visual response characteristics in accordance with an observation distance to intensities of the moirés equal to or greater than a first intensity threshold value among intensities of the moirés at frequencies of the moirés equal to or less than a frequency threshold value defined on the basis of a display resolution of the display unit. The wiring pattern, which is made to be irregular, is a wavy wiring pattern in which the plurality of thin metal lines, which form a regular polygonal wiring pattern having the indicator of evaluation of moirés equal to or less than the evaluation threshold value, is formed as the wavy lines of which amplitudes are equal to or less than an amplitude threshold value.

Further, in order to achieve the object, according to a second aspect of the present invention, a display device comprises: a display unit in which pixels, which include a plurality of sub-pixels emitting light with a plurality of colors that are different from each other, are arranged in pixel array patterns which are repeated in a certain direction and a direction perpendicular to the certain direction; and the conductive film according to the first aspect of the present invention, the conductive film being provided on the display unit.

In order to achieve the above-mentioned object, according to a third aspect of the present invention, there is provided a method of evaluating a conductive film that is provided on a display unit of a display device and has two wiring portions which are formed on both sides or a single side of the transparent substrate. The method comprises: providing a plurality of thin metal lines on at least one wiring portion of the two wiring portions; causing the plurality of thin metal lines of at least one wiring portion of the two wiring portions to have a wiring pattern which is formed of wavy lines so as to have irregularity, causing the plurality of thin metal lines or center lines of the wavy lines to have a polygonal wiring pattern formed in a mesh shape, and arranging a plurality of polygonal opening portions in the wiring portion, arranging pixels, which include a plurality of sub-pixels emitting light with a plurality of colors that are at least three colors different from each other, in pixel array patterns, in the display unit; providing the conductive film on the display unit such that the wiring patterns of the two wiring portions overlap with the pixel array patterns of the display unit;

acquiring transmittance image data of a regular polygonal wiring pattern, which is not made to be irregular, and luminance image data of the pixel array patterns of respective colors of the plurality of colors of the display unit when light beams with the plurality of colors are respectively emitted, from at least one point of view; calculating a first peak frequency and a first peak intensity of a plurality of first spectrum peaks of two-dimensional Fourier spectra of transmittance image data of the regular polygonal wiring pattern and a second peak frequency and a second peak intensity of a plurality of second spectrum peaks of two-dimensional Fourier spectra of luminance image data of the pixel array patterns of the respective colors of the plurality of colors, for each color, by performing two-dimensional Fourier transform on the transmittance image data of the regular polygonal wiring pattern and the luminance image data of the pixel array pattern; calculating frequencies and intensities of moirés of the respective colors of the plurality of colors from the first peak frequency and the first peak intensity of the wiring pattern and the second peak frequency and the second peak intensity of the sub-pixel array patterns of the respective plurality of colors calculated in the above-mentioned manner, selecting moirés having frequencies equal to or less than a frequency threshold value and intensities equal to or greater than a first intensity threshold value defined on the basis of a display resolution of the display unit, among the frequencies and intensities of the moirés of the respective colors calculated in the above-mentioned manner; acquiring evaluation values of moirés of the respective colors by applying human visual response characteristics in accordance with an observation distance to the intensities of moirés at respective frequencies of moirés of the respective colors selected in the above-mentioned manner, calculating an indicator of evaluation of the moirés from the evaluation values of the moirés of the respective colors acquired in the above-mentioned manner; acquiring regular polygonal wiring patterns which allows the indicator of evaluation of moirés calculated in the above-mentioned manner to be equal to or less than a predetermined value; and evaluating the conductive film that has a wavy wiring pattern in which the plurality of thin metal lines, which form the acquired regular polygonal wiring pattern having the indicator of evaluation of moirés equal to or less than the predetermined value, is formed as the wavy lines of which amplitudes are equal to or less than an amplitude threshold value.

In any one aspect of the first to third aspects, it is preferable that the irregularity of the wavy wiring pattern is made by amplitudes, wavelengths, and phases of the wavy lines constituting the plurality of thin metal lines.

Further, it is preferable that the evaluation threshold value is −3.00, and the amplitude threshold value is 20% of a pitch of the regular polygonal wiring pattern. It is more preferable that a range of the amplitude is equal to or greater than 2.0% and equal to or less than 20%.

It is preferable that the polygonal shape is a rhomboid shape.

It is preferable that the luminance image data of the pixel array patterns of the respective colors is normalized luminance data that is obtained by normalizing the luminance image data obtained by converting captured image data of the colors, which is obtained by capturing images of the pixel array patterns of the respective colors displayed on a display screen of the display unit, into luminance values, when the light beams with the plurality of colors are separately emitted.

Further, it is preferable that images of the pixel array patterns of the respective colors displayed on the display screen of the display unit are displayed on the display unit when the light beams with the plurality of colors are separately emitted at a maximum intensity which is settable for each color.

Furthermore, it is preferable that when the plurality of colors is three colors such as red, green, and blue, the captured image data of the images of the pixel array patterns of the respective colors such as red, green, and blue is image data that is obtained through imaging performed through white balance adjustment based on a white color of a Macbeth chart.

It is preferable that the luminance image data of the images of the pixel array patterns of the respective colors of the plurality of colors is obtained by giving the luminance data in which a measured luminance value is normalized through a product between a resolution of the display unit and an area having a value of a mask image, where the mask image is created from the captured image data which is obtained by capturing the image of the pixel array pattern of a current color displayed on the display screen of the display unit through a microscope, when the light beams of the respective colors of the plurality of colors are separately emitted in the display unit, and the luminance image data is obtained by normalizing a reference luminance of the display unit of the display device to 1.0.

Further, it is preferable that, when the plurality of colors is three colors such as red, green, and blue, the measured luminance value is a luminance value which is obtained from spectrum data of each color of red, green, and blue by separately performing display for each color of red, green, and blue and performing measurement through a spectrometer, and the mask image is an image that is obtained by binarizing the captured image data which is obtained through imaging of the microscope.

It is preferable that the two wiring portions are respectively formed on both side surfaces of the transparent substrate.

Alternatively, it is preferable that the conductive film further comprises a second transparent substrate that is different from a first transparent substrate when the transparent substrate is defined as the first transparent substrate, one wiring portion of the two wiring portions is formed on one surface of the first transparent substrate, and the other wiring portion of the two wiring portions is formed on one surface of the second transparent substrate, on the other surface side of the first transparent substrate.

Alternatively, it is preferable that the two wiring portions are respectively formed with insulation layers interposed therebetween on single sides of the transparent substrates.

It is preferable that all the plurality of thin metal lines of the two wiring portions constitutes the wavy wiring pattern.

Alternatively, it is preferable that the plurality of thin metal lines of one wiring portion of the two wiring portions constitutes the wavy wiring pattern, and the plurality of thin metal lines of the other wiring portion constitutes a regular polygonal wiring pattern which allows the indicator of evaluation of moirés to be equal to or less than the evaluation threshold value.

Alternatively, it is preferable that at least one wiring portion of the two wiring portions includes an electrode portion and a non-electrode portion, the plurality of thin metal lines of one of the electrode portion and the non-electrode portion constitutes the wavy wiring pattern, and the plurality of thin metal lines of the other of the electrode portion and the non-electrode portion constitutes a regular polygonal wiring pattern which allows the indicator of evaluation of moirés to be equal to or less than the evaluation threshold value.

Further, it is preferable that the plurality of thin metal lines of one wiring portion of the two wiring portions constitutes the wavy wiring pattern, and the other wiring portion is made of indium tin oxide.

It is preferable that the plurality of first spectrum peaks has a peak intensity that is equal to or greater than a first threshold value which is selected from a plurality of spectrum peaks obtained by performing two-dimensional Fourier transform on the transmittance image data of the wiring pattern, and for each of the plurality of colors, the plurality of second spectrum peaks has a peak intensity that is equal to or greater than a second threshold value which is selected from a plurality of spectrum peaks obtained by performing two-dimensional Fourier transform on the luminance image data of the pixel array pattern.

Further, it is preferable that a frequency of a moiré corresponding to each color is given as a difference between the first peak frequency and the second peak frequency corresponding to each color, and an intensity of the moiré corresponding to each color is given as a product between the first peak intensity and the second peak intensity corresponding to each color.

It is preferable that an evaluation value of the moiré is calculated by weighting a visual transfer function, which corresponds to the observation distance as the visual response characteristics, to the frequency and the intensity of the moiré through convolution integration.

Further, it is preferable that the visual transfer function VTF is given by the following Expression (1).

$$VTF = 5.05 e^{-0.138\,k}(1 - e^{0.1\,k}) \qquad (1)$$

$$k = \pi d u / 180$$

Here, k is a spatial frequency (cycle/deg) defined by a solid angle, u shown in the above-mentioned Expression (1) is a spatial frequency (cycle/mm) defined by a length, and d is defined by an observation distance (mm).

It is preferable that the indicator of evaluation of the moirés is calculated using a largest quantitative value among the quantitative values of the plurality of the moirés in which a frequency of one of the moirés is weighted in accordance with the observation distance for each color.

Further, it is preferable that the indicator of evaluation of the moirés is a largest sum among sums for the plurality of colors, the sums being obtained by adding the frequencies of all the moirés to the largest evaluation value selected with respect to the frequency of one of the moirés for each color.

It is preferable that the first intensity threshold value is −4.5 as a common logarithm, and the frequency threshold value is a spatial frequency which is obtained from the resolution of the display unit, and a moiré, which is selected in order to apply the visual response characteristics, has an intensity which is equal to or greater than −3.8.

Further, it is preferable that assuming that a display pixel pitch of the display unit is Pd µm, the spatial frequency obtained from the resolution of the display unit is a highest frequency of the moirés which is given as 1000/Pd cycle/mm.

Furthermore, it is preferable that, from at least two points of view of front observation and oblique observation, the evaluation value is obtained for each color of the plurality of colors, and the indicator of evaluation is a largest evaluation value among evaluation values of respective colors obtained in the at least two points of view.

In addition, it is preferable that the pixel array patterns are black matrix patterns.

As described above, according to the present invention, there is provided a conductive film having the random (irregular) mesh-shaped wiring pattern (mesh pattern) corresponding to the intensity of the display regardless of the observation distance, even in a case where the pattern overlaps with the pixel array pattern of a display unit (display) having a different emission intensity (luminance). Thereby, it is possible to prevent moiré from occurring, and it is possible to greatly improve visibility.

In particular, according to the present invention, the conductive film has a random mesh pattern in which the emission intensity of the display unit is considered, when the conductive film overlaps with a black matrix of a display unit of a display device having a different emission intensity and is visually perceived, in a case where the transparent conductive film having the mesh pattern is used as a touch panel electrode. Thereby, it is possible to suppress occurrence of moiré which greatly disturbs image quality, and it is possible to greatly improve visibility of the display on the touch panel.

Further, according to the present invention, in addition to the above-mentioned effect, also in a design of a mesh pattern of the conductive film in a case where the opening shapes of the RGB sub-pixels of the display have frequencies and intensities (shapes and sizes) different from each other, it is possible to provide best image quality in combination with the pixel array pattern of a display having a different emission intensity.

BRIEF DESCRIPTION OF THE DRAWINGS

FIG. 1 is a partial cross-sectional view schematically illustrating an example of a conductive film according to a first embodiment of the present invention.

FIG. 2 is a plan view schematically illustrating an example of a wavy wiring pattern which is obtained by making thin metal lines of the wiring portion of the conductive film, which is shown in FIG. 1, as wavy lines.

FIG. 3 is a plan view schematically illustrating a regular rhomboid wiring pattern before the thin metal lines of the wiring pattern shown in FIG. 2 are made as wavy lines.

FIG. 11A is a schematic diagram illustrating an example of a structure of the mesh wiring pattern shown in FIG. 3, FIG. 11B is a schematic diagram illustrating an example of a structure of the pixel array pattern of the display unit shown in FIG. 9, FIG. 11C is an example of a graph of a transmittance (T) of the mesh wiring pattern in the present invention, FIG. 11D is an example of a graph of an intensity (I) of a representative sub-pixel of the display unit, and FIGS. 11E and 11F are examples of graphs of transmittances (T) of the representative sub-pixels of the mesh wiring pattern and the display unit in the related arts.

FIG. 12B is a partially enlarged view of the pixel array patterns of FIG. 12A.

FIGS. 15A to 15F are schematic diagrams illustrating examples of repetition units each having 2×2 pixels of representative sub-pixels of pixel array patterns of display units of which resolutions and shapes are different.

DESCRIPTION OF THE PREFERRED EMBODIMENTS

Figure 4:
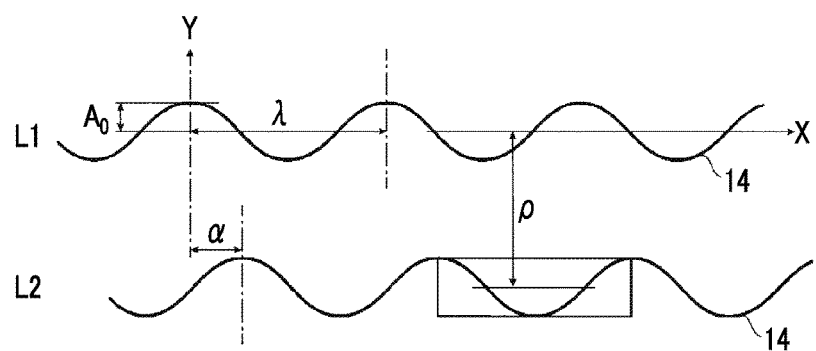
FIG. 4 is an explanatory view for explaining wavy lines of the thin metal lines constituting the wavy wiring pattern of the wiring portion of the conductive film shown in FIG. 1.

Hereinafter, a conductive film according to the present invention, a display device having the same, and a method of evaluating the conductive film will be described in detail with reference to most preferred embodiments shown in the accompanying drawings.

Hereinafter, the conductive film according to the present invention will be described as a representative example of a conductive film for a touch panel. The present invention is not limited to this. The conductive film may be any conductive film if it is a conductive film that is provided on the display unit with various light emission intensities of the display device and has wiring portions having wavy wiring patterns which are disposed on both sides of a transparent substrate or disposed on a single side thereof with an insulation layer interposed therebetween and which include at least one wiring pattern formed of cells (opening portions) having predetermined irregular shapes. For example, as a matter of course, the present invention may be applied to a conductive film for shielding electromagnetic waves and the like. In the present invention, the cells having the predetermined shapes are cells formed by wavy lines of the thin metal lines of which the center lines form polygons. The wavy wiring pattern is formed of the thin metal lines, which are wavy, so as to have irregularity.

The display unit of the display device on which the conductive film according to the present invention is superposed is not particularly limited. However, examples thereof include a liquid crystal display (LCD), a plasma display panel (PDP), organic light emitting (EL) diode (OLED) and an organic electro-luminescence display (OELD) using organic electro-luminescence (OEL), an inorganic electro-luminescence (EL) display, electronic paper, and the like.

As will be described in detail later, the display unit (hereinafter also referred to as a display) of the display device, on which the conductive film of the present invention is superposed, is not particularly limited if the display unit has the following characteristics. Pixels thereof, each of which includes a plurality of sub-pixels emitting light with a plurality of colors including at least mutually different three colors such as red, green, and blue, are arranged in the pixel array pattern (hereinafter also referred to as the BM pattern), and the luminances (brightnesses) of respective sub-pixels (color filters) based on the emission intensity (luminance) of the pixels are not particularly limited if the luminances can be taken into consideration in terms of evaluation of the visibility of moiré due to the superposition of the conductive film. For example, in the same manner as that of the related arts, the display unit may have the following characteristics. The repetition cycles and the intensities (shapes, sizes), that is, the sub-pixel array pattern (the shapes, sizes, and cycles of the sub-pixels) of the sub-pixels (color filters) are all the same for a plurality of colors such as RGB, and the display unit has a BM pattern typified by G sub-pixels. Further, like the above-mentioned OELD, the display unit may be a display unit having a BM pattern that includes sub-pixel array patterns which are not the same for a plurality of colors, that is, which are different with respect to at least two colors.

In a manner similar to that of a high resolution smartphone, a tablet terminal, or the like, the display of the display device subjected to the present invention may be a display which has a high emission intensity. In a manner similar to that of a low resolution desktop PC, a television (TV), or the like, the display may be a display having a low emission intensity. In a manner similar to that of a medium resolution laptop or the like, the display may be a display having approximately a medium emission intensity.

FIG. 1 is a partial cross-sectional view schematically illustrating an example of a conductive film according to a first embodiment of the present invention. FIG. 2 is a plan view schematically illustrating an example of an irregular wiring pattern of a wiring portion of the conductive film shown in FIG. 1.

As shown in the drawings, a conductive film 10 of the present embodiment is a conductive film that is provided on the display unit of the display device and that has a wiring pattern which is excellent in terms of suppression of occurrence of moiré in the black matrix (BM) of the display unit, particularly, a wiring pattern which is optimized in terms of visibility of moiré in the BM pattern when the wiring pattern overlaps with the BM pattern. The conductive film 10 has: a transparent substrate 12; a first wiring portion 16a that is formed on one surface (an upper surface in FIG. 1) of the transparent substrate 12, is formed of a plurality of thin lines made of metal (hereinafter referred to as thin metal lines) 14, and functions as a first electrode portion; a first protective layer 20a that is bonded to substantially the entire surface of the first wiring portion 16a through a first adhesive layer 18a so as to cover the thin metal lines 14; a second wiring portion (electrode) 16b that is formed on the other surface (a lower surface in FIG. 1) of the transparent substrate 12, is formed of a plurality of thin metal lines 14, and functions as a second electrode portion; and a second protective layer 20b that is bonded to substantially the entire surface of the second wiring portion 16b through a second adhesive layer 18b.

Hereinafter, the first wiring portion 16a and the second wiring portion 16b are collectively referred to as simply wiring portions 16, the first adhesive layer 18a and the second adhesive layer 18b are collectively referred to as simply adhesive layers 18, and the first protective layer 20a and the second protective layer 20b are collectively referred to as simply protective layers 20.

The transparent substrate 12 is formed of a material having an insulation property and having a high light-permeability, and examples thereof include a resin, glass, and silicon. Examples of the resin include polyethylene terephthalate (PET), polymethyl methacrylate (PMMA), polypropylene (PP), polystyrene (PS), and the like.

The thin metal lines 14 are not particularly limited as long as they are thin lines which are formed as wavy lines and made of metal having high conductivity, and include thin lines made of a line material such as gold (Au), silver (Ag) or copper (Cu). While it is more preferable indeed in terms of visibility if the thin metal lines 14 have a smaller line width, the line width has only to be equal to or less than 30 μm, for instance. For application to a touch panel, the line width of the thin metal lines 14 is preferably equal to or greater than 0.1 μm and equal to or less than 15 μm, more preferably equal to or greater than 1 μm and equal to or less than 9 μm, and still more preferably equal to or greater than 2 μm and equal to or less than 7 μm.

Each wiring portion 16 (16a, 16b) has a plurality of wavy thin metal lines 14 having the wiring pattern 24 (24a, 24b) which is formed of wavy mesh wires 21 (21a, 21b) arranged in a mesh shape. Specifically, as shown in FIG. 2, the wiring pattern 24 (24a, 24b) is a mesh pattern in which opening portions (cells) 22 (22a, 22b) are arranged in a predetermined shape formed by intersecting the plurality of thin metal lines 14 with each other.

As shown in FIG. 2, each wiring portion 16 (16a and 16b) is formed of the wavy thin metal lines 14 and a wiring layer 28 (28a and 28b) that has the wiring pattern 24 (24a and 24b) formed in a mesh shape by the opening portions (cells) 22 (22a and 22b) between the thin metal lines 14 adjacent to each other. Each of the wiring patterns 24a and 24b is a wiring pattern that is made to be irregular by making the plurality of thin metal lines, which constitute opening portions having polygonal shapes such as rhomboid shapes in the example shown in the drawing, as wavy lines, that is, a random pattern 25a which is randomized by making the thin metal lines as wavy lines. The random pattern 25a is a wiring pattern in which the center lines of the wavy line of the wavy thin metal lines 14 forms polygonal shapes and the opening portions 22 having rhomboid shapes in the example shown in the drawing are consecutively connected in the predetermined two directions in which the thin metal lines 14 intersect with each other.

In the example shown in FIG. 1, the wiring patterns 24 are provided as the wiring patterns 24a and 24b. The wiring patterns 24 have wiring patterns in which the mesh shape of the plurality of opening portions 22 adjacent to each other is made to be irregular by making the thin metal lines 14 as wavy lines, that is, so-called random patterns 25a, as shown in FIG. 2.

In each irregular wiring pattern (random pattern) 25a shown in FIG. 2, the mesh is made to be irregular (random) in a predetermined range, through blurring performed by making the thin metal lines 14 as wavy lines. The thin metal lines 14 constitute a regular rhomboid wiring pattern in which the multiple opening portions 22c having the same rhomboid shapes are regularly repeated as shown in FIG. 3, that is a so-called typical pattern 25b. Here, as will be described later, the typical pattern 25b having regular rhomboids shown in FIG. 3 is a typical pattern which allows an indicator of evaluation of moiré to be equal to or less than an evaluation threshold value. The indicator is calculated from an evaluation value of moiré in evaluation of visibility of moiré, which is caused by superposing the conductive film 10 having the typical pattern 25b on the black matrix (BM) pattern 38 (refer to FIGS. 9 and 12 and the like) of the display unit 30. It should be noted that, in the present invention, the visibility of moiré is defined by a degree at which moiré is not visually perceived.

By making the wiring pattern 24 of the conductive film 10 as the random pattern 25a which is randomized by making the mesh as wavy lines as described above, an intensity of moiré can be attenuated.

Here, in the random pattern 25a, the mesh wires 21 are formed of the wavy thin metal lines 14 shown in FIG. 4. In FIG. 4, for description of the wavy lines, two wavy lines L1 and L2 of the thin metal lines 14, which extend in a single direction, are shown. The wavy lines L1 and L2 shown in FIG. 4 are obtained by changing the straight lines L1 and L2 of the thin metal lines 14 of the regular rhomboid typical pattern 25b shown in FIG. 3 into wavy lines. The wavy lines L1 and L2 of the thin metal lines 14 of the random pattern 25a shown in FIG. 2 are arranged with a phase difference given in the extending direction.

As shown in FIG. 4, the wavy lines L1 and L2 each can be represented by or can be approximated to a trigonometric function, for example, a sine wave.

In the present invention, assuming that an amplitude of the sine wave is $A_0$, a wavelength thereof is $\lambda$, and a phase thereof is $\alpha$, in the wavy lines shown in FIG. 4, for example, if the wavy line L1 is set as a reference and is represented by a sine wave, the wavy line L1 can be represented by $Y=A_0 \sin(2\pi/\lambda)X$. The wavy line L2 can be represented by $Y=A_0 \sin\{(2\pi/\lambda)(x-\alpha)\}$, where $\alpha$ is the phase.

Here, the amplitude $A_0$ corresponds to a coefficient of the sine wave. Further, the wavelength $\lambda$ corresponds to a length of a period. Furthermore, the phase $\alpha$ corresponds to an amount of deviation (shift) between drawing start points of the wavy lines L1 and L2 adjacent to each other.

Randomicity (irregularity) of the wavy line of the thin metal lines 14 shown as described above can be defined by a ratio (percentage %) of the amplitude $A_0$, the wavelength $\lambda$, and the phase $\alpha$ to a pitch p of the regular rhomboid typical pattern 25b shown in FIG. 3. For example, in a case where a degree of randomicity of 10% of each of the wavelength $\lambda$, the phase (for each line) $\alpha$, and the amplitude (for each wavelength) $A_0$ is given to a diamond mesh pattern of 100 μm, the respective degrees change within ranges of 90 to 110 μm, 90 to 110 μm, and 0 to 10 μm.

In the present invention, the random pattern 25a, which is obtained by making the thin metal lines 14 as wavy lines with respect to the regular rhomboid typical pattern 25b shown in FIG. 3, in the case of the amplitude $A_0$ of the wavy line, it is preferable that the degree of randomicity satisfies a range of an amplitude threshold value or less, preferably equal to or less than 20%, and more preferably equal to or greater than 2.0% and equal to or less than 20%. It can be said that the conductive film 10 having the random pattern 25a, which satisfies the range of randomicity, is excellent in terms of visibility of moiré since moiré is not visually perceived when the film is superposed on the BM pattern 38 (refer to FIGS. 9 and 12 and the like) of the display unit 30.

It should be noted that, in the present invention, the degree of randomicity of the wavy lines is not particularly limited as long as the degree of randomicity satisfies the above-mentioned range, and any type thereof may be used.

As will be described in detail later, the conductive film 10 of the present invention has a wavy wiring pattern of which the angles are made to be irregular (random) with respect to the rhomboid shapes of the regular rhomboid wiring patterns which are optimized in terms of visibility of moiré at a predetermined luminance (luminance image data) of the BM pattern of the display unit when the upper and lower wiring patterns 24a and 24b are formed as a combined wiring pattern 24. In the present invention, the rhomboid wiring pattern, which is optimized in terms of visibility of moiré with respect to the BM pattern with the predetermined luminance, is defined as a single wiring pattern or a group of two or more wiring patterns making moiré not perceived by human visual sensation with respect to the BM pattern with the predetermined luminance when the rhomboid wiring pattern is formed as the combined wiring pattern 24.

Consequently, the wiring pattern 25b is a rhomboid wiring pattern that is optimized in terms of visibility of moiré at the predetermined luminance (luminance image data) of the BM pattern of the display unit when formed as a combined wiring pattern 24.

The wiring pattern 25b is a rhomboid wiring pattern which allows an indicator of evaluation of moiré to be equal to or less than a predetermined evaluation threshold value, preferably, −3.00 as a common logarithm. The indicator is calculated from synthetic image data of the combined wiring pattern 24, in which upper and lower wiring patterns 24a and 24b overlap with each other, as transmittance image data of the wiring pattern 25b and luminance image data of the BM pattern of each color obtained when light beams with the plurality of colors of the display are respectively emitted.

The wiring pattern 25b itself is a rhomboid wiring pattern which is superimposed on a display screen of the display with a predetermined emission intensity, is able to sufficiently prevent moiré from occurring and to improve visibility, and is optimized in terms of visibility of moiré with respect to the BM pattern with the predetermined luminance of the display unit.

The wiring portion 16c shown in FIG. 3 is formed of the thin metal lines 14 and a wiring layer 28c that has a wiring pattern 25b formed in a mesh shape by the opening portions (cells) 22c between adjacent thin metal lines 14.

In the present invention, the wiring (mesh) pattern optimized in such a manner is made to be irregular in a predetermined manner through making of wavy lines. Thereby, it is possible to generate a robust wiring pattern.

In the present invention, the rhomboid wiring pattern, which is optimized in terms of visibility of moiré with respect to the BM pattern with the predetermined luminance of the display unit, is randomized in a predetermined manner. The reason for this is that the optimized pattern is favorable in terms of image quality, but is randomized, whereby it is possible to further improve image quality.

In such an optimized wiring (mesh) pattern 25b, disconnections (brakes) may be inserted into a side (mesh wires 21c) of the thin metal lines 14 constituting the opening portions 22c. As the shape of the mesh-shaped wiring pattern having such breaks, it is possible to employ a shape of a mesh-shaped wiring pattern of a conductive film described in JP2012-276175 relating to the present application of the applicant.

Figure 5A:
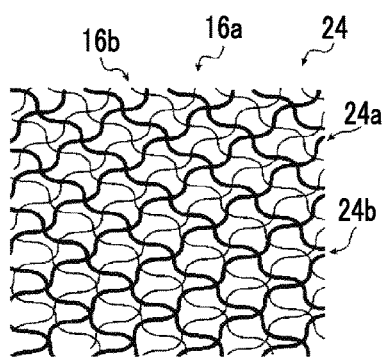
FIGS. 5A and 5B are plan views schematically illustrating examples of a combined wiring pattern which is formed by overlapping wiring patterns of the upper and lower wiring portions of the conductive film shown in FIG. 1 and the conductive film according to another embodiment of the present invention, respectively.
Figure 5B:
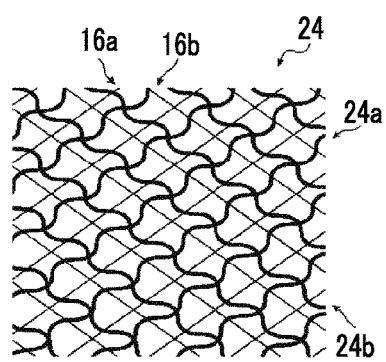

In the conductive film 10 of the embodiment shown in FIG. 1, in FIG. 1, the plurality of thin metal lines 14 of the first wiring portion 16a on the upper side (viewing side) of the transparent substrate 12, and the plurality of thin metal lines 14 of the second wiring portion 16b on the lower side (display side), respectively have, as the wiring patterns 24a and 24b, the irregular wiring patterns 25a shown in FIG. 2. As shown in FIG. 5A, the combined wiring pattern 24, which is made to be irregular by overlapping the irregular wiring patterns 24a and 24b on the upper and lower sides, is formed. In FIGS. 5A and 5B, in order to facilitate understanding, the plurality of thin metal lines 14 constituting the upper wiring pattern 24a is indicated by the heavy lines, and the plurality of thin metal lines 14 constituting the lower wiring pattern 24b is indicated by the thin lines. Here, it is needless to say that widths of the heavy lines and the thin lines may not be real line widths of the thin metal lines 14, may be equal thereto, and may be different therefrom.

That is, in the example shown in FIG. 1, the first and second wiring portions 16a and 16b each are formed of a plurality of thin metal lines having such an irregular wiring pattern shown in FIG. 2. However, the present invention is not limited to this, at least a part of either one wiring portion 16 thereof may have a plurality of thin metal lines having the irregular wiring pattern 25a shown in FIG. 2.

As described above, the irregular (randomized) wiring pattern 25a is formed of the entirety or a part of the thin metal lines of the wiring portion 16 (wiring portion 16a or 16b) on the upper or lower side of the conductive film, and the mesh-shaped wiring pattern, in which the wiring patterns of both wiring portions 16 overlaps and are combined, is randomized. As a result, it is possible to randomize the light transmitted through the mesh-shaped wiring pattern, and it is possible to improve visibility of moiré which is caused by interference between the display and the regular wiring pattern.

For example, as shown in FIG. 5B, the first and second wiring portions 16a and 16b each are formed of a plurality of thin metal lines having a different wiring pattern. In the example shown in FIG. 5B, the first wiring portion 16a on the upper side of the transparent substrate 12 is formed of the plurality of thin metal lines 14 having the irregular wiring pattern 25a shown in FIG. 2, and the second wiring portion 16b on the lower side of the transparent substrate 12 is formed of the plurality of thin metal lines 14 having the regular wiring pattern 25b shown in FIG. 3. On the contrary, the first wiring portion 16a may be formed of the plurality of thin metal lines 14 having the regular wiring pattern 25b shown in FIG. 3, and the second wiring portion 16b may be formed of the plurality of thin metal lines 14 having the irregular wiring pattern 25a. In such a manner, the combined wiring pattern, in which the irregular wiring pattern 25a and the regular wiring pattern 25b overlap with each other, can be made to be irregular.

Figure 6:
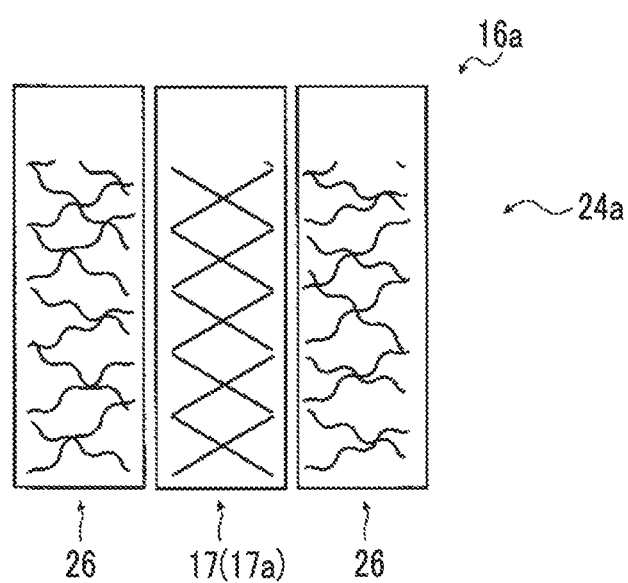
FIG. 6 is a plan view schematically illustrating an example of the upper wiring pattern of the wiring portion of the conductive film according to another embodiment of the present invention.

Alternatively, as shown in FIG. 6, the plurality of thin metal lines 14 of at least one of the first and second wiring portions 16a and 16b may be divided into dummy electrode portions (non-electrode portions) 26 and the electrode portion 17 constituting the wiring layer 28, by using the disconnections (brakes), as described above. Then, either one of the electrode portion 17 or the dummy electrode portion 26 may be formed of the plurality of thin metal lines 14 having the irregular wiring pattern 25a shown in FIG. 2, and the other one may be formed of the plurality of thin metal lines 14 having the regular wiring pattern 25b shown in FIG. 3. Such a configuration may be applied to the conductive film 11 of a second embodiment of the present invention shown in FIG. 7 to be described later. In such a manner, it is possible to make irregular a combined wiring pattern in which a combination between the irregular wiring pattern 25a and the regular wiring pattern 25b overlaps with the wiring pattern 25a or wiring pattern 25b or a combined wiring pattern in which combinations between the irregular wiring pattern 25a and the regular wiring pattern 25b overlap each other.

In FIG. 6, the first wiring portion 16a on the upper side of the transparent substrate 12 is divided into an electrode portion 17a and two dummy electrode portions 26 on the right and left sides thereof, by using disconnections (brakes). The two dummy electrode portions 26 each are formed of the plurality of thin metal lines 14 having the irregular wiring pattern 25a shown in FIG. 2. The electrode portion 17a is formed of the plurality of thin metal lines 14 having the regular wiring pattern 25b shown in FIG. 3. However, it is apparent that a configuration opposite to the above-mentioned configuration may be adopted.

In the examples shown in FIGS. 5A, 5B, and 6, the first wiring portion 16a and the second wiring portion 16b each are formed of the plurality of thin metal lines 14. However, the present invention is not limited to this, instead of the plurality of thin metal lines 14, one wiring portion may be formed of wires which are patterned by a transparent conductive layer such as ITO (Indium Tin Oxide (tin-doped indium oxide)).

For example, in the example shown in FIG. 5B and an example opposite thereto, wires patterned by ITO may be used instead of the plurality of thin metal lines 14 having one regular wiring pattern 25b of the first wiring portion 16a and the second wiring portion 16b.

Further, as shown in FIG. 6, one of the first wiring portion 16a and the second wiring portion 16b may be divided into an electrode portion 17a and two dummy electrode portions 26 on the right and left sides thereof, by using disconnections (brakes), and one of the electrode portion 17a and the dummy electrode portions 26 may be formed of the plurality of thin metal lines 14 having a randomized wiring pattern. In this case, wires patterned by ITO may be used instead of the plurality of thin metal lines 14 constituting the other wiring portion.

A structure of the conductive film 11 of the second embodiment of the present invention shown in FIG. 7 will be described below.

As described above, the first protective layer 20a is bonded to the substantially entire surface of the wiring layer 28a formed of the first wiring portion 16a through the first adhesive layer 18a so as to cover the thin metal lines 14 of the first wiring portion 16a. Further, the second protective layer 20b is bonded to the substantially entire surface of the wiring layer 28b formed of the second wiring portion 16b through the second adhesive layer 18b so as to cover the thin metal lines 14 of the second wiring portion 16b.

Here, examples of materials of the adhesive layers 18 (the first adhesive layer 18a and the second adhesive layer 18b) include a wet lamination adhesive, a dry lamination adhesive, a hot melt adhesive, and the like. The material of the first adhesive layer 18a and the material of the second adhesive layer 18b may be the same or may be different.

The protective layers 20 (the first protective layer 20a and the second protective layer 20b) each are made of a high transmissive material including resin, glass, and silicon, similarly to the transparent substrate 12. The material of the first protective layer 20a and the material of the second protective layer 20b may be the same or may be different.

It is preferable that both a refractive index n1 of the first protective layer 20a and a refractive index n2 of the second protective layer 20b are values equal or approximate to a refractive index n0 of the transparent substrate 12. In this case, both the relative refractive index nr1 of the transparent substrate 12 with respect to the first protective layer 20a and the relative refractive index nr2 of the transparent substrate 12 with respect to the second protective layer 20b are values approximate to 1.

In this specification, the refractive index means a refractive index for the light at a wavelength of 589.3 nm (sodium D ray). For example, in regard to resins, the refractive index is defined by ISO 14782: 1999 (corresponding to JIS K 7105) that is an international standard. Further, the relative refractive index nr1 of the transparent substrate 12 with respect to the first protective layer 20a is defined as nr1= (n1/n0), and the relative refractive index nr2 of the transparent substrate 12 with respect to the second protective layer 20b is defined as nr2=(n2/n0).

Here, the relative refractive index nr1 and the relative refractive index nr2 are preferably in a range equal to or greater than 0.86 and equal to or less than 1.15, and more preferably in a range equal to or greater than 0.91 and equal to or less than 1.08.

By limiting the ranges of the relative refractive index nr1 and the relative refractive index nr2 as the above-mentioned range and controlling a member-to-member light transmittance between the transparent substrate 12 and the protective layers 20 (20a, 20b), visibility of moiré can be further improved, and thus the conductive film can be improved.

In the conductive film 10 of the embodiment shown in FIG. 1, the wiring portions 16 (16a and 16b) on both the upper and lower sides of the transparent substrate 12 each are formed as an electrode portion having the plurality of thin metal lines 14. However, the present invention is not limited to this, and at least one of the first and second wiring portions 16a and 16b may be formed of an electrode portion and a non-electrode portion (dummy electrode portion).

Figure 7:
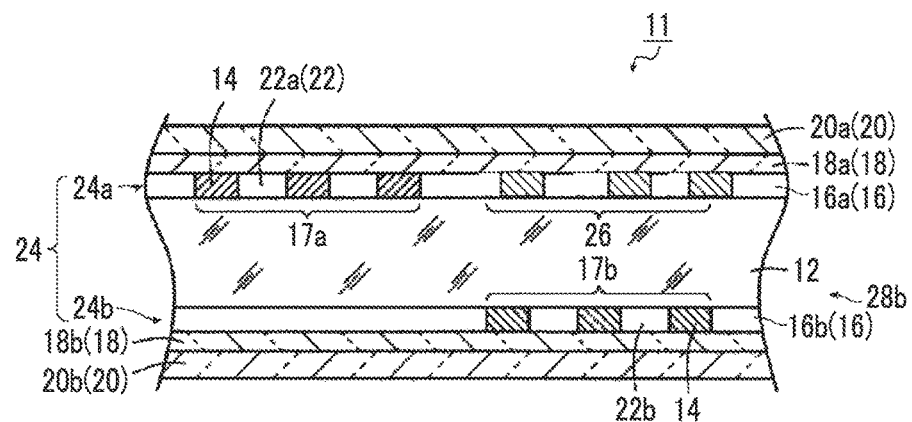
FIG. 7 is a schematic partial cross-sectional view of an example of a conductive film according to a second embodiment of the present invention.

FIG. 7 is a schematic partial cross-sectional view of an example of the conductive film according to the second embodiment of the present invention. The plan view of the wiring patterns of the conductive film according to the second embodiment shown in FIG. 7 is the same as the plan view of the wiring patterns shown in FIGS. 2 and 3, and accordingly, will be omitted herein.

As shown in the drawing, the conductive film 11 according to the second embodiment has: the first wiring portion 16a that is formed of the first electrode portion 17a and the dummy electrode portion 26 which are formed on one surface (on the upper side in FIG. 7) of the transparent substrate 12; the second wiring portion 16b that is formed of the second electrode portion 17b which is formed on the other surface (on the lower side in FIG. 7) of the transparent substrate 12; the first protective layer 20a that is bonded to the substantially entire surface of the first wiring portion 16a, which is formed of the first electrode portion 17a and the dummy electrode portion 26, through the first adhesive layer 18a; and the second protective layer 20b that is boned to the substantially entire surface of the second wiring portion 16b, which is formed of the second electrode portion 17b, through the second adhesive layer 18b.

In the conductive film 11, the first electrode portion 17a and the dummy electrode portion 26 each are formed of the plurality of thin metal lines 14 and both thereof are formed as the wiring layer 28a on one surface (on the upper side in FIG. 7) of the transparent substrate 12, and the second electrode portion 17b is formed of the plurality of thin metal lines 14 and is formed as the wiring layer 28b on the other surface (on the lower side in FIG. 7) of the transparent substrate 12. Here, the dummy electrode portion 26 is formed on one surface (on the upper side in FIG. 7) of the transparent substrate 12 similarly to the first electrode portion 17a, and has the plurality of thin metal lines 14 similarly arranged at positions corresponding to the plurality of thin metal lines 14 of the second electrode portion 17b formed on the other surface (on the lower side in FIG. 7), as shown in the drawing.

The dummy electrode portion 26 is separated from the first electrode portion 17a by a predetermined distance, and is in the state of being electrically insulated from the first electrode portion 17a.

In the conductive film 11 according to the present embodiment, the dummy electrode portion 26 formed of the plurality of thin metal lines 14 corresponding to the plurality of thin metal lines 14 of the second electrode portion 17b formed on the other surface (on the lower side in FIG. 7) of the transparent substrate 12 is formed on one surface (on the upper side in FIG. 7) of the transparent substrate 12. Therefore, scattering due to the thin metal lines on the one surface (on the upper side in FIG. 7) of the transparent substrate 12 can be controlled, and it is thus possible to improve visibility of electrode.

Here, the first electrode portion 17a and the dummy electrode portion 26 of the wiring layer 28a have the wiring pattern 24a having a mesh shape which is formed by the thin metal lines 14 and opening portions 22. The second electrode portion 17b of the wiring layer 28b has a wiring pattern 24b having a mesh shape which is formed by the thin metal lines 14 and opening portions 22, similarly to the first electrode portion 17a. As described above, the transparent substrate 12 is formed of an insulating material, and the second electrode portion 17b is in the state of being electrically insulated from the first electrode portion 17a and the dummy electrode portion 26.

In addition, the first and second electrode portions 17a and 17b and the dummy electrode portion 26 each can be formed of the same material as the wiring portions 16 of the conductive film 10 shown in FIG. 1 in the same manner.

The first protective layer 20a is bonded to the substantially entire surface of the wiring layer 28a formed of the first electrode portion 17a and the dummy electrode portion 26 through the first adhesive layer 18a so as to cover the thin metal lines 14 of the first electrode portion 17a and the dummy electrode portion 26 of the first wiring portion 16a.

Further, the second protective layer 20b is bonded to the substantially entire surface of the wiring layer 28b formed of the second electrode portion 17b through the second adhesive layer 18b so as to cover the thin metal lines 14 of the second electrode portion 17b of the second wiring portion 16b.

It should be noted that the first and second adhesive layers 18a and 18b and the first and second protective layers 20a and 20b of the conductive film 11 shown in FIG. 7 are those of the conductive film 10 shown in FIG. 1, and a description thereof will be omitted.

In the conductive film 11 of the present embodiment, the second wiring portion 16b having the second electrode portion 17b does not have the dummy electrode portion. However, the present invention is not limited to this, and in the second wiring portion 16b, the dummy electrode portion, which is electrically insulated from the second electrode portion 17b at a predetermined interval away from the first electrode portion 17a and is formed of the thin metal lines 14, may be disposed at a position corresponding to the first electrode portion 17a of the first wiring portion 16a.

In the conductive film 11 of the present embodiment, the dummy electrode portion 26 is provided on the first wiring portion 16a, and such a dummy electrode portion is provided on the second wiring portion 16b. Thereby, the dummy electrode portions may be disposed to correspond to respective mesh wires of the first electrode portion 17a of the first wiring portion 16a and the second electrode portion 17b of the second wiring portion 16b. Therefore, scattering due to the thin metal lines on the one surface (on the upper or lower side in FIG. 7) of the transparent substrate 12 can be controlled, and it is thus possible to improve visibility of electrode.

In the conductive films 10 and 11 of the first and second embodiments shown in FIGS. 1 and 7, the wiring portions 16 (16a and 16b) are respectively formed on both upper and lower sides of the transparent substrate 12. However, the present invention is not limited to this, and in a manner similar to that of a conductive film 11A of a third embodiment of the present invention shown in FIG. 8, the following structure may be adopted: the wiring portion 16 formed of the plurality of thin metal lines 14 may be formed on one surface (the upper surface in FIG. 8) of the transparent substrate 12, and two conductive film elements, in which the protective layers 20 are bonded to substantially the entire surfaces of the wiring portions 16 through the adhesive layers 18 so as to cover the thin metal lines 14, overlap with each other.

Figure 8:
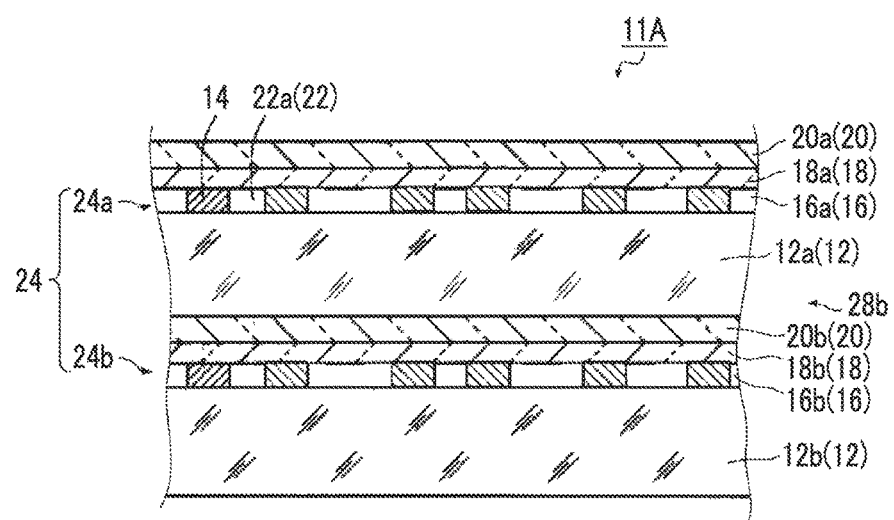
FIG. 8 is a schematic partial cross-sectional view of an example of a conductive film according to a third embodiment of the present invention.

The conductive film 11A of the third embodiment of the present invention shown in FIG. 8 has: a lower transparent substrate 12b in FIG. 8; the second wiring portion 16b that is formed of the plurality of thin metal lines 14 formed on the upper surface of the transparent substrate 12b; the second protective layer 20b that is bonded onto the second wiring portion 16*b* through the second adhesive layer 18*b*; an upper transparent substrate 12*a* that is bonded onto and disposed on the second protective layer 20*b* through for example an adhesive or the like; the first wiring portion 16*a* that is formed of the plurality of thin metal lines 14 formed on the upper surface of the transparent substrate 12*a*; and the protective layer 20*a* that is bonded onto the first wiring portion 16*a* through the adhesive layer 18*a*.

Here, the entirety or a part of at least one of the thin metal lines 14 of the first wiring portion 16*a* and/or second wiring portion 16*b* is the irregular wiring pattern shown in FIG. 2.

Figure 9:
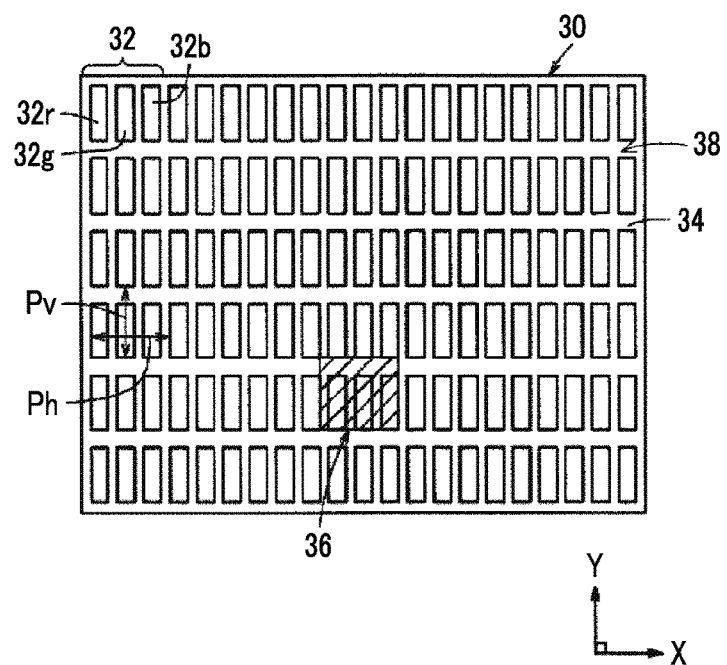
FIG. 9 is a schematic explanatory diagram illustrating an example of a pixel array pattern of a part of the display unit using the conductive film according to the present invention.

The above-mentioned conductive films 10, 11, and 11A of the first, second, and third embodiments of the present invention are applied to, for example, a touch panel (44: refer to FIG. 10) of a display unit 30 (display) schematically shown in FIG. 9. However, from at least one point of view, there is provided a wiring pattern which is optimized in terms of visibility of moiré with respect to a luminance value of the pixel array (BM) pattern of each color depending on the emission intensity of the display. In the present invention, the wiring pattern, which is optimized in terms of visibility of moiré with respect to the luminance value of the pixel array (BM) pattern of each color depending on the emission intensity of the display, is defined as a single wiring pattern or a group of two or more wiring patterns making moiré not perceived by human visual sensation with respect to the BM pattern of the current color even when any color light beam of the light beams with respective colors of the plurality of the sub-pixels of the display is emitted alone, from at least one point of view. That is, the optimized wiring pattern is defined as a group of wiring patterns making moiré not perceived by human visual sensation with respect to a BM pattern of a color in which moiré is most likely to occur, for example, a color having a highest luminance value at the time of lighting on for each color of a plurality of colors such as RGB, that is, with respect to a BM pattern having a worst value. In the present invention, a group of two or more wiring patterns optimized may be ranked, from a wiring pattern making moiré most difficult to be perceived to a wiring pattern making moiré somewhat difficult to perceive, so as to determine one wiring pattern which makes moiré most difficult to perceive.

Here, in the present invention, in terms of optimization of visibility of moiré of the wiring pattern, a reason why the luminance value of the BM pattern of each color depending on the emission intensity of the display is used is, for example, as follows. It is assumed that the conductive film has a wiring pattern with line widths and pitches of the thin metal lines shown in FIG. 11A, and the display has a BM pattern in which one pixel is typified by one sub-pixel as shown in FIG. 11A. In this case, considering one pixel of the display, transmittance image data of the wiring pattern is as shown in FIGS. 11C and 11E. In both the present invention and the related art such as JP2013-214545A, parts corresponding to the line widths of the thin metal lines do not transmit light, and thus 0 can be set, and gaps between the thin metal lines transmit light, and thus 1.0 can be set. As a result, both can be represented as binary data, and each value is completely constant. However, since the BM of the display does not transmit light, a transmittance thereof is 0, but since each sub-pixel (color filter) transmits light, an intensity of the light, for example, a luminance value thereof changes depending on the emission intensity of the display as shown in FIG. 11D. In contrast, transmittance image data of array pattern of the sub-pixels (color filters), that is, the BM pattern of the display according to the related art such as JP2013-214545A is as shown in FIG. 11F. The sub-pixel (color filter) of the display transmits light, and thus 1.0 is set. The BM of the display does not transmit light, and thus 0 is set. Therefore, the emission intensity of the display is not considered.

Meanwhile, as in a high resolution smartphone, if the emission intensity is strong, moiré visually perceived is strong, and if the emission intensity is weak, moiré visually perceived is weak. Therefore, as in the related art, indicators of evaluation of moirés obtained in displays having different emission intensities, that is, quantitative values thereof cannot be compared on the basis of the transmittance image data only. As a result, it is not possible to correctly evaluate the visibility of moiré.

Hence, in the present invention, emission intensities of different displays are evaluated and normalized on the basis of an emission intensity of a reference display. Thereby, it is possible to optimize the visibility of moiré of the wiring pattern which can be applied to various displays having different emission intensities.

Next, in the present invention, a wiring pattern is optimized as a combined wiring pattern in terms of visibility of moiré and is thereafter made to be irregular (random) with respect to the BM (pixel array) pattern in a state where light with each color of the plurality of colors is emitted alone. The wiring pattern is defined as a wiring pattern which is made to be irregular in a predetermined manner and thereby randomized with respect to the angles of the rhomboid shapes of the rhomboid wiring pattern optimized as described above. Accordingly, in the present invention, it can be said that the wiring (mesh) pattern, which is obtained by making angles irregular, is a random pattern in which angles and pitches or side lengths of a plurality of adjacent opening portions are different.

Application of irregularity and optimization of visibility of moiré of the wiring pattern, which are essential in the present invention, at the luminance value of the BM pattern of each color depending on the emission intensity of the display will be described later.

The conductive film according to the present invention basically has the above-mentioned configuration.

FIG. 9 is a schematic explanatory diagram schematically illustrating an example of a pixel array pattern of a part of the display unit using the conductive film of the present invention.

As the part thereof is shown in FIG. 9, the display unit 30 has a plurality of pixels 32 arranged in a matrix shape to constitute a predetermined pixel array pattern. Each pixel 32 has a configuration in which three sub-pixels (a red sub-pixel 32*r*, a green sub-pixel 32*g*, and a blue sub-pixel 32*b*) are arranged in a horizontal direction. Each sub-pixel has a rectangular shape which is long in the vertical direction. The arrangement pitch (horizontal pixel pitch Pv) of the pixels 32 in the horizontal direction and the arrangement pitch (vertical pixel pitch Pv) of the pixels 32 in the vertical direction are substantially equal to each other. That is, a shape (refer to a region 36 indicated by hatching), which is formed of a single pixel 32 and a black matrix (BM) 34 (pattern material) surrounding the single pixel 32, is a square shape. Further, an aspect ratio of the single pixel 32 is not 1, and satisfies the following expression: a length thereof in the horizontal (transverse) direction>a length thereof in the vertical (longitudinal) direction.

As can be clearly seen from FIG. 9, the pixel array pattern formed of the sub-pixels 32*r*, 32*g*, and 32*b* of each of the plurality of pixels 32 is defined by a BM pattern 38 of BMs 34 respectively surrounding the sub-pixels 32*r*, 32*g*, and 32*b*. Moiré, which occurs when the conductive film 10 or 11 is superposed on the display unit 30, is caused by interference between the BM pattern 38 of the BMs 34 of the display unit 30 and the wiring pattern 24 of the conductive film 10, 11, or 11A. Therefore, precisely, the BM pattern 38 is an inverted pattern of the pixel array pattern, but here, these patterns are regarded as the same patterns.

For example, the conductive film 10, 11, or 11A may be disposed on a display panel of the display unit 30 having the BM pattern 38 formed by the BMs 34. In this case, the wiring pattern 24 (a combined wiring pattern of the wiring patterns 24a and 24b) of the conductive film 10, 11, or 11A, in which at least one of the wiring patterns 24a and 24b is randomized, is optimized and thereafter randomized in terms of visibility of moiré with respect to the BM (pixel array) pattern 38. Therefore, there is no interference in spatial frequency between the array cycle of the pixels 32 and the wiring array of the thin metal lines 14 of the conductive film 10, 11, or 11A, and occurrence of moiré is suppressed. As a result, the conductive film is excellent in terms of visibility of moiré. Hereinafter, the conductive film 10 will be described as a representative example, but the description is the same as those of the conductive film 11 and 11A.

It should be noted that the display unit 30 shown in FIG. 9 may be formed as a display panel such as a liquid crystal panel, a plasma panel, an organic EL panel, or an inorganic EL panel, and an emission intensity thereof may be different in accordance with a resolution.

The BM pattern and the emission intensity of the display, which can be applied to the present invention, is not particularly limited, and may be the same as the BM pattern and the emission intensity of a known display. For example, as shown in FIGS. 12A, 12B, 13A, 13B, and 13C, a display such as OLED having different cycles and intensities of the respective colors of RGB may be used. A display, which is formed of RGB sub-pixels having the same shapes as shown in FIG. 9 or FIGS. 14A and 14B and in which an intensity variation of the sub-pixels is large, or a display, in which an intensity variation of the sub-pixels is small and only a G sub-pixel (channel) having a highest intensity is considered, may be used. In particular, a display such as a smartphone or a tablet having a high intensity may be used.

Figure 12A:
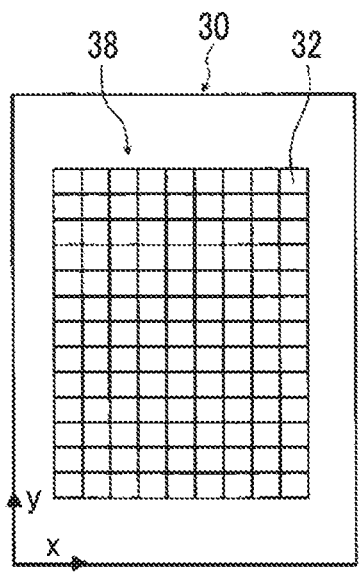
FIGS. 12A and 12B are respectively schematic explanatory diagrams illustrating an example of a part of pixel array patterns of a display unit using the conductive film according to the present invention.
Figure 12B:
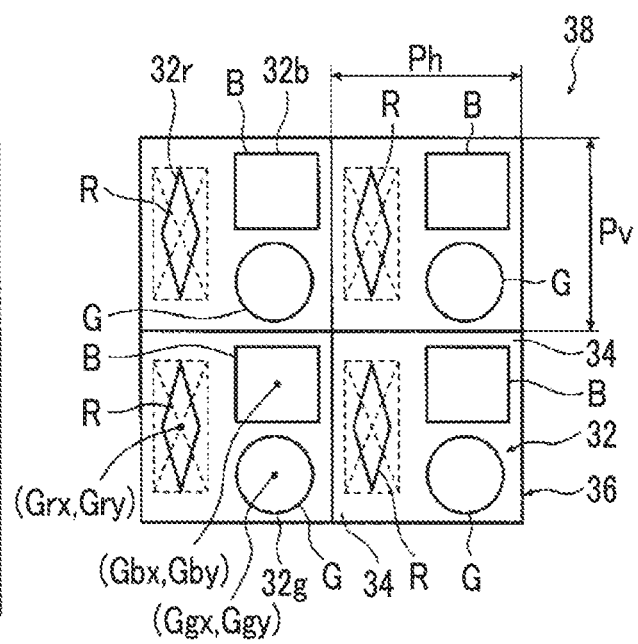

FIGS. 12A and 12B are respectively a schematic explanatory diagram illustrating an example of a part of pixel array patterns of a display unit using the conductive film according to the present invention, and a partially enlarged view of the part.

As shown in FIG. 12A, the display unit 30 has a plurality of pixels 32 arranged in a matrix shape to constitute a predetermined pixel array pattern. As shown in FIG. 12A, each pixel 32 has a configuration in which three sub-pixels (a red sub-pixel 32r, a green sub-pixel 32g, and a blue sub-pixel 32b) are arranged in a horizontal direction.

In the present invention, it is necessary for the pixel array pattern of the display unit to satisfy any of the following three conditions: a condition in which at least two sub-pixels among a plurality of sub-pixels in a single pixel, the three sub-pixels in the example shown in the drawing, have different shapes; a condition in which cycles of sub-pixel array patterns formed by arrays each corresponding to at least two sub-pixels among a plurality of (three) sub-pixels in a single pixel are different; or a condition in which a plurality of (three) sub-pixels in a single pixel is not lined up in one direction. In addition, in the present invention, the cycles of the sub-pixel array patterns, that is, the cycles of the sub-pixels (color filters) also include a cycle of sub-pixels in a single pixel.

In the example shown in FIG. 12B, each sub-pixel 32r has a rhomboid shape that is vertically long in the y (vertical) direction in the drawing, and is disposed on the left side of each square-shaped pixel 32 in the drawing, each sub-pixel 32g has a circular shape, and is disposed on the lower right side of the pixel 32 in the drawing, and each sub-pixel 32b has a rectangular shape (square shape), and is disposed on the upper right side of the pixel 32 in the drawing. In the display unit 30 shown in FIGS. 12A and 12B, a pixel array pattern 38 corresponds to a case where forms of three sub-pixels 32r, 32g, and 32b within a single pixel are different such that intensities thereof are different, and corresponds to a case where a plurality of (three) sub-pixels in a single pixel is not lined up in a single direction.

In the example shown in the drawing, the arrangement pitch (horizontal pixel pitch Ph) of the pixels 32 in the horizontal direction and the arrangement pitch (vertical pixel pitch Pv) of the pixels 32 in the vertical direction are substantially equal to each other, and are referred to as a pixel pitch Pd. That is, a region, which is formed of the three sub-pixels 32r, 32g, and 32b of a single pixel 32, and a pixel region 36, which is formed of a black matrix (BM) 34 (pattern material) surrounding the sub-pixels 32r, 32g, and 32b, have square shapes. It should be noted that the pixel region 36 corresponds to a single pixel 32, and therefore the pixel region 36 is hereinafter also referred to as a pixel.

It should be noted that the pixel pitch Pd (the horizontal or vertical pixel pitch Ph or Pv) may have any value if it is a pitch corresponding to a resolution of the display unit 30, and may be, for example, a pitch in a range of 84 μm to 264 μm.

In the examples shown in the drawing, the shapes of the sub-pixels 32r, 32g, and 32b within one pixel are respectively a rhomboid, a circle, and a rectangle. However, the present invention is not limited to this, and the shapes may be any shapes if there is provided the pixel array pattern 38. In the pixel array pattern 38, three sub-pixels having the same forms shown in FIG. 9 are lined up in the horizontal direction of the drawing, each pixel 32 is repeated in the horizontal direction and the vertical direction, and the cycles and intensities of the sub-pixels (color filters) are the same for the three sub-pixels of RGB.

Figure 13A:
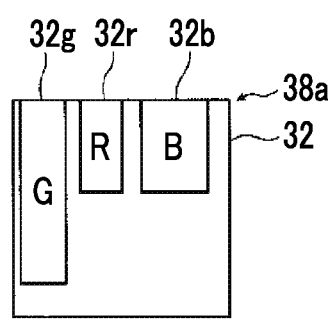
FIGS. 13A to 13C are respectively schematic explanatory diagrams illustrating examples of constituent units of pixel array patterns in which at least either shapes or cycles of three sub-pixels applied to the present invention are different.
Figure 13B:
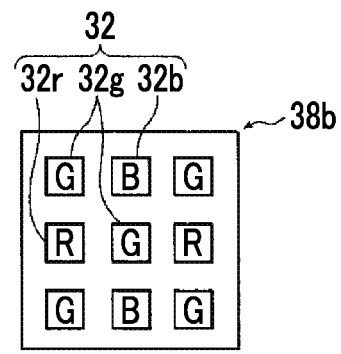
Figure 13C:
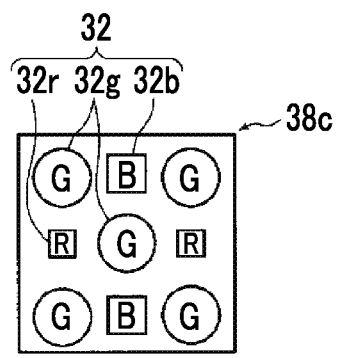
Figure 14A:
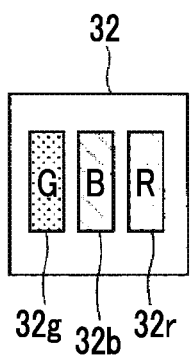
FIGS. 14A and 14B are respectively explanatory diagrams schematically illustrating examples of variations of intensities of three sub-pixels in the pixels of the pixel array pattern of the display unit shown in FIG. 9.
Figure 14B:
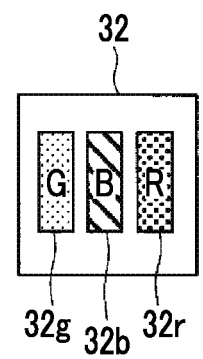

Alternatively, the sub-pixels (color filters) 32r, 32g, and 32b having opening shapes called a pin tile structure shown in FIGS. 13A to 13C may be used. In addition, there may be provided pixel array patterns each of which is formed of the sub-pixels 32r, 32g, and 32b.

As shown in FIG. 13A, the forms of the three sub-pixels 32r, 32g, and 32b of the pixel 32 may be different (the shapes may be rectangles, but the sizes thereof may be different). This case corresponds to the case where the intensities thereof are different. In this case, it can be said that the cycles of the sub-pixels are the same.

That is, in the example shown in FIG. 13A, the pixel array pattern 38a is formed such that each pixel is formed of the three sub-pixels 32r, 32g, and 32h having different forms. Any of the cycles of the respective sub-pixel array patterns of the three sub-pixels 32r, 32g, and 32b is the same as the cycle of the pixel array pattern 38a.

It should be noted that in the present invention, the condition, in which the forms of the sub-pixels are different, is defined to include not only a case where the shapes of the sub-pixels are different but also a case where the sizes of the sub-pixels are different.

As shown in FIG. 13B, even when the forms of the three sub-pixels 32r, 32g, and 32b are the same, a repetition cycle (the cycle of the sub-pixel array pattern) of the sub-pixels 32g may be different from repetition cycle of the sub-pixels 32r and 32b. In this example, the cycle of the sub-pixels 32g is a half of the cycle of the sub-pixels 32r and 32b. In this case, it can be said that the intensities of the sub-pixels are the same.

That is, in the example shown in FIG. 13B, a pixel array pattern 38b is formed such that each pixel 32 is formed of four sub-pixels including the two sub-pixels 32g and the sub-pixels 32r and 32b. Either of the cycles of the respective sub-pixel array patterns of the sub-pixels 32r and 32b is the same as the cycle of the pixel array pattern 38b. The cycle of the sub-pixel array pattern of the sub-pixels 32g is a half of the cycle of the pixel array pattern 38b.

As shown in FIG. 13C, the repetition cycle (the cycle of the sub-pixel patterns) and the form (both the shape and the size) of the sub-pixels 32g may be different from those of the sub-pixels 32r and 32b. This case corresponds to the case where both the cycles and the intensities of the sub-pixels are different.

That is, in the example shown in FIG. 13C, in a manner similar to the example shown in FIG. 13B, a pixel array pattern 38c is formed such that each pixel 32 is formed of four sub-pixels including the two sub-pixels 32g and the sub-pixels 32r and 32b. Either of the cycles of the respective sub-pixel array patterns of the sub-pixels 32r and 32b is the same as the cycle of the pixel array pattern 38c. The cycle of the sub-pixel array pattern of the sub-pixels 32g is a half of the cycle of the pixel array pattern 38c.

FIG. 14A shows a BM structure of a pixel in which an intensity variation of GBR sub-pixels is large and which is formed of RGB sub-pixels having the same shapes. FIG. 14B shows a BM structure of a pixel in which an intensity variation of GBR sub-pixels is small and which is formed of RGB sub-pixels having the same shapes. Considering only a G sub-pixel having a highest intensity, a wiring pattern of the conductive film can be designed.

The resolutions and shapes of the BMs each having 2×2 pixels of the display used in the present invention are shown in FIGS. 15A to 15F. Either resolutions or shapes (luminances) of the respective BMs shown in FIGS. 15A to 15F are different. FIGS. 15A to 15F show only the G channel (G sub-pixels), and do not show the B channel (B sub-pixels) and the R channel (R sub-pixels), but it is apparent that the resolutions and the shapes thereof are the same.

FIG. 15A shows four G sub-pixels having reed shapes, which are curved toward the center and the left side in the drawing, at a resolution of 149 dpi, in a BM indicated by No. 1.

FIG. 15B shows four G sub-pixels having plate shapes which are arranged in the vertical direction in the drawing, at a resolution of 265 dpi, in a BM indicated by No. 2, and FIG. 15C shows four G sub-pixels having plate shapes which are arranged in the horizontal direction in the drawing, at a resolution of 265 dpi, in a BM indicated by No. 3.

FIG. 15D shows four G sub-pixels having rectangular shapes which are arranged in the vertical direction in the drawing, at a resolution of 326 dpi, in a BM indicated by No. 4.

FIG. 15E shows four G sub-pixels having small rectangular shapes which are arranged in four angular directions in the drawing, at a resolution of 384 dpi, in a BM indicated by No. 5.

FIG. 15F shows four G sub-pixels having rectangular shapes which are arranged in the vertical direction in the drawing, at a resolution of 440 dpi, in a BM indicated by No. 6.

It should be noted that in all FIGS. 15A to 15F, intensities, which are normalized by an intensity of a reference display, for example, a display LP101WX1(SL) (n3) (manufactured by LG Display Corp.) used in examples, are assumed as the same predetermined intensities.

For example, the conductive film 10, 11, or 11A may be disposed on a display panel of the display unit 30 having the BM pattern 38 formed by the BMs 34 that defines the above-mentioned sub-pixel array pattern of RGB. In this case, the wiring pattern 24 is optimized in terms of visibility of moiré and further randomized with respect to the luminance value of the BM (pixel array) pattern 38 including the sub-pixel array patterns of RGB. Therefore, there is almost no interference in spatial frequency between the array cycle or intensity of the pixels 32 of the display unit 30 and the wiring array of the thin metal lines 14 of the conductive film 10, 11, or 11A, and occurrence of moiré is suppressed.

However, the pixel array pattern of the display, which is used when optimization of moiré is optimized, is precisely defined by each sub-pixel array pattern of the plurality of colors such as RGB, for example, repetition frequencies and shapes of the sub-pixels. Therefore, it is necessary to accurately define a resolution of the sub-pixels with respect to the resolution of the display. However, in the present invention, it is necessary to use the light intensity of the pixel array pattern of the display, for example, the luminance value (luminance image data). Therefore, in terms of the intensity frequency, it can be said that it is not necessary to clearly divide RGB since a problem arises in that sub-pixels (indicate a single channel) with a certain intensity are arranged in a certain manner. Consequently, in order to design a randomized mesh pattern which is optimal for the display, when indicators, that is, quantitative values of evaluation of moiré are calculated, a worst value thereof at the time of lighting on for each color of RGB may be used.

Figure 10:
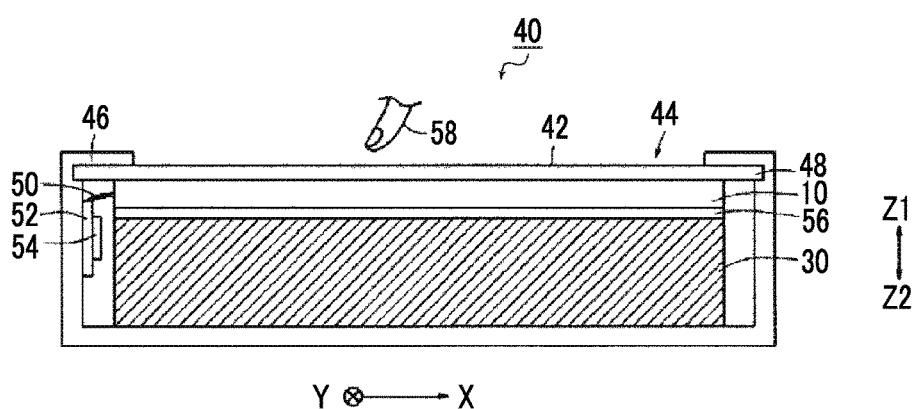
FIG. 10 is a schematic cross-sectional view of one example of a display device provided with the conductive film shown in FIG. 1.

Next, a display device, in which the conductive film of the present invention is incorporated, will be described with reference to FIG. 10. In FIG. 10, a projected capacitive type touch panel, in which the conductive film 10 according to the first embodiment of the present invention is incorporated, will be described as a representative example of a display device 40, but it is needless to say that the present invention is not limited to this example.

As shown in FIG. 10, the display device 40 includes the display unit 30 (refer to FIG. 9) that can display a color image and/or a monochrome image, a touch panel 44 that detects a contact position on an input surface 42 (located on the side as directed by the arrow Z1), and a housing 46 in which the display unit 30 and the touch panel 44 are housed. A user is able to access the touch panel 44 through a large opening portion provided in one surface (on the side as directed by the arrow Z1) of the housing 46.

The touch panel 44 includes not only the conductive film 10 (refer to FIGS. 1 and 2) described above but also a cover member 48 stacked on one surface (on the side as directed by the arrow Z1) of the conductive film 10, a flexible substrate 52 electrically connected to the conductive film 10 through a cable 50, and a detection control unit 54 disposed on the flexible substrate 52.

The conductive film 10 is bonded to one surface (on the side directed by the arrow Z1) of the display unit 30 through an adhesive layer 56. The conductive film 10 is disposed on the display screen such that the other main surface side (second wiring portion 16b side) is opposite to the display unit 30.

The cover member 48 functions as the input surface 42 by covering one surface of the conductive film 10. In addition, by preventing a contact member 58 (for example, a finger or a stylus pen) from coming into direct contact with the conductive film 10, it is possible to suppress the occurrence of a scratch, adhesion of dust, and the like, and thus it is possible to stabilize conductivity of the conductive film 10.

The material of the cover member 48 may be, for example, glass or a resin film. One surface (on the side as directed by the arrow Z2) of the cover member 48 may be coated with silicon oxide or the like, and may be adhered to one surface (on the side as directed by the arrow Z1) of the conductive film 10. Further, in order to prevent damage due to rubbing or the like, the conductive film 10 and the cover member 48 may be configured to be bonded to each other.

The flexible substrate 52 is an electronic substrate having flexibility. In the example shown in this diagram, the flexible substrate 52 is fixed to an inner wall of the housing 46, while the position of the substrate may be varied. The detection control unit 54 constitutes an electronic circuit that catches a change in the capacitance between the contact member 58 and the conductive film 10 and detects the contact position (or the approach position) when the contact member 58 as a conductor is brought into contact with (or comes closer to) the input surface 42.

The display device, to which the conductive film according to the present invention is applied, basically has the above-mentioned configuration.

Next, in the present invention, processes of performing optimization and randomization in terms of visibility of moiré on a wiring pattern of the conductive film with respect to a predetermined pixel array (BM) pattern of the display device having a predetermined intensity (luminance value) will be described. That is, a description will be given of the processes of evaluating and determining a wiring pattern which is optimized and randomized such that moiré with respect to a predetermined pixel array (BM) pattern of the display device with a predetermined intensity is not perceived by human visual sensation, from at least one point of view, in the conductive film according to the present invention.

Figure 16:
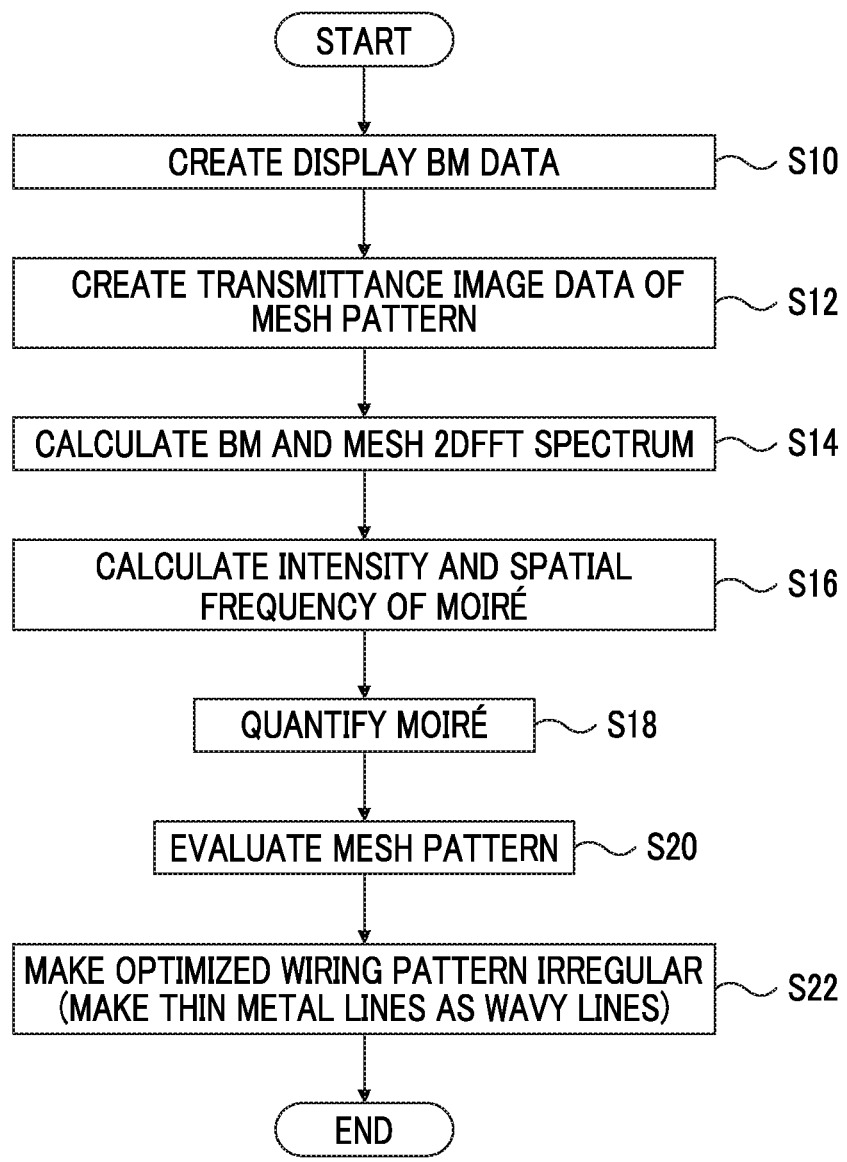
FIG. 16 is a flowchart illustrating an example of a method of evaluating wiring on the conductive film according to the present invention.

FIG. 16 is a flowchart illustrating an example of a method of evaluating the conductive film of the present invention.

In the method of evaluating the wiring pattern of the conductive film of the present invention, first, moirés (frequencies and intensities) of the respective colors with frequencies equal to or less than a highest frequency of moirés and predetermined intensities defined in accordance with a display resolution of the display unit, are collected on the basis of the frequencies and the intensities of moirés which are obtained through frequency analysis using fast Fourier transforms (FFT) of luminance image data of the BM (pixel array) patterns at the time of lighting on for each color of the plurality of colors (for example, RGB) of the display unit of the display device and transmittance image data of the combined wiring pattern which is formed of the upper and lower rhomboid wiring patterns of the conductive film, evaluation values of moirés of the respective colors are obtained by applying human visual response characteristics to intensities of moirés at the frequencies of the collected moirés of the respective colors in accordance with the observation distance, an indicator of evaluation (quantitative value) of moirés is calculated on the basis of the obtained evaluation values of the plurality of moirés, and a rhomboid wiring pattern which constitutes a combined wiring pattern satisfying a condition where the calculated indicator of evaluation of moirés is set in advance, is evaluated as a rhomboid wiring pattern which is optimized such that moirés are not visually perceived, and is determined as a wavy wiring pattern in which the optimized rhomboid wiring pattern is made to be irregular in a predetermined range through making of wavy lines. In the method according to the present invention, FFT is generally used for the frequencies and intensities of moirés, and the following processes are defined because the frequency and intensities of a target may greatly vary depending on the way of usage.

One of the upper and lower wiring portions 16a and 16b of the conductive film may be formed of the plurality of thin metal lines 14 having the rhomboid wiring pattern, and the other wiring portion may be formed as a transparent conductive layer such as ITO having the rhomboid wiring pattern. In this case, transmittance image data of the combined wiring pattern of both rhomboid wiring patterns is indicated by transmittance image data of one rhomboid wiring pattern formed of the plurality of thin metal lines 14. However, hereinafter, even in this case, the above-mentioned transmittance image data is treated as transmittance image data of the combined wiring pattern of both rhomboid wiring patterns.

In the present invention, first, it is preferable that the following is considered: the display screen of the display unit of the display device is observed from one point of view in the front. In this case, the present invention is not limited to this, but the display screen may be observed from any point of view if visibility of moiré can be improved in a case where observation is performed from at least one point of view.

As might be expected, in the present invention, it is preferable that the following cases are considered: a case where the display screen is observed from the front (a case of front observation); and a case where the display screen is obliquely observed (a case of oblique observation).

Hereinafter, the following item will be described: imaging is performed for each color on the BM (pixel array) pattern which has sub-pixels with three colors such as RGB.

In the method according to the present invention, as shown in FIG. 16, first, in step S10 as process 1, display BM data is created.

Figure 17:
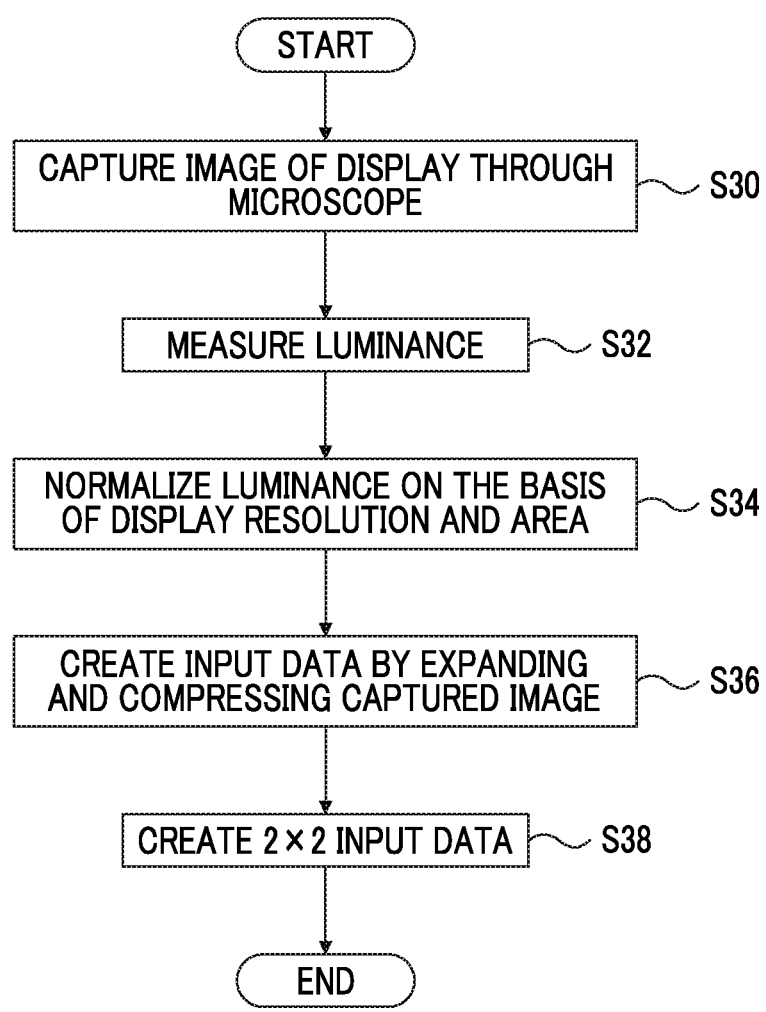
FIG. 17 is a flowchart illustrating a specific example of a method of creating display BM data for a method of evaluating the conductive film of the present invention.

Here, a method of creating display BM data in step S10 is shown in detail in FIG. 17.

FIG. 17 is a flowchart illustrating a specific example of the method of creating display BM data in the method of evaluating the conductive film of the present invention.

As shown in FIG. 17, first, in step S30, imaging of the display is performed using a microscope. That is, in step S30, an image of the display screen (an image of the sub-pixel array pattern of each color) of the display unit of the display device is captured for each color of RGB.

In step S30, first, the display unit 30 of the display device 40 is turned on for each color of RGB. At this time, it is preferable that the luminance is maximized in a range in which it can be obtained through setting change of a light emitting side (display device 40).

Subsequently, an image of the sub-pixels is captured in a state where the sub-pixels of each color of RGB are lit on. That is, an image of transmitted light of each of the sub-pixels (RGB color filters) 32r, 32g, and 32b of the pixel array patterns 38 (38a to 38c) of the display unit 30 shown in FIGS. 9, 12B, and 13A to 13C is captured by using a microscope. In the imaging, it is preferable that white balance of a microscope is adjusted to white color of Macbeth chart.

A target display, and a microscope, a lens, and a camera used in imaging are not particularly limited, but, for example, LP101WX1(SL) (n3) (manufactured by LG DISPLAY Corp.) can be used as the display, STM6 (manufactured by OLYMPUS Corp.) can be used as the microscope, UMPlanFI10x (manufactured by OLYMPUS Corp.) can be used as the lens, and QIC-F-CLR-12-C (manufactured by QIMAGING Corp.) can be used as the camera.

In the example of the present invention, the LP101WX1 (SL) (n3) is used as the display, first, only the G channel is lit on with a maximum (MAX) intensity, the STM6 manufactured by OLYMPUS Corp. is used as the microscope, the UMPlanFI10x manufactured by OLYMPUS Corp. is used as the objective lens, and thereby imaging is performed.

Here, as the imaging conditions, for example, an exposure time period can be set to 12 ms, a gain can be set to 1.0, and white balance (G, R, B) can be set to (1.00, 2.17, 1.12). In addition, it is preferable that the captured image is subjected to shading correction.

Figure 18A:
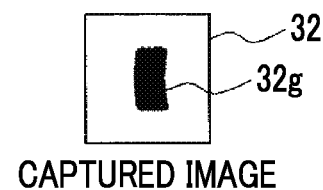
FIG. 18A is a schematic diagram illustrating an example of a captured image of a G sub-pixel of the display unit using the conductive film according to the present invention.

As a result, it is possible to acquire an image of one pixel of a G channel sub-pixel shown in FIG. 18A.

Here, in the present invention, the display is not limited, and any display may be used as a reference display, but it is preferable that the LP101WX1(SL) (n3) is used as a reference of the display.

Further, the BM pattern of the display LP101WX1(SL) (n3) has the BM patterns shown in FIG. 15A. It should be noted that FIG. 15A show only G channel patterns but the same configuration is applied to the RB channels.

An image of one pixel of each sub-pixel of the RB channels can also be captured in the same manner as an image of one pixel of the G channel sub-pixel.

Next, after imaging, RGB luminance pixel information (luminance image data) is acquired by measuring spectra of the sub-pixel images through a spectrometer (small fiber optical spectrometer) and performing luminance conversion on the basis of the measured spectrum data.

For example, as described below, RGB sub-pixel (BM) input data may be created using the spectrometer.

Figure 18B:
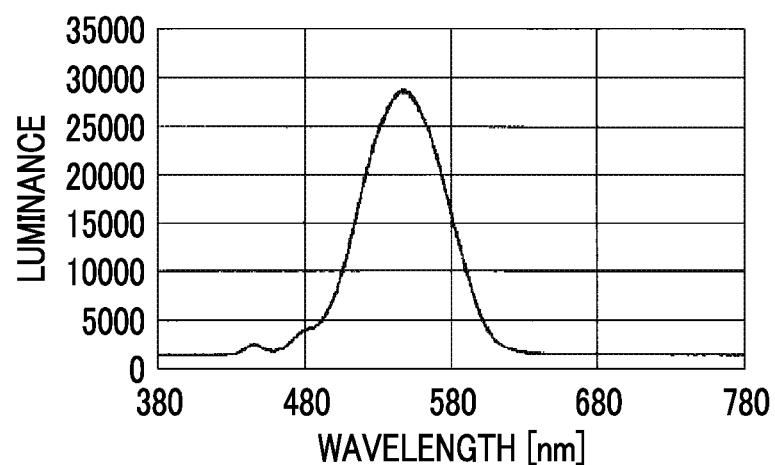
FIG. 18B is a graph illustrating an example of a spectrum of the G sub-pixel.

1. First, in step S32, measurement of the luminances is performed. The sub-pixels of the G channel of the display unit 30 are lit on in a single color, and light is measured by the spectrometer. As a result, for example, spectrum data shown in FIG. 18B can be obtained from the G sub-pixels. Spectrum data can be obtained from the RB sub-pixels in the same manner as the G sub-pixels.

In luminance measurement, a spectrometer USB2000+ manufactured by OCEAN OPTICS Inc. is used, a diffuser plate (CC-3-UV-S manufactured by OCEAN OPTICS Inc.) at the leading end of a fiber of the spectrometer is used, and an integration time period is set to 250 ms.

2. Next, in step S34, the image, which is captured through the microscope in step S10, is masked and binarized, and a mask image is created from image data of the captured image. In a method of creating the mask image, in a case of the G channel, for the G channel of the captured image data, an average value of pixel sizes of the light-on BMs is calculated, and mask data is acquired when the average value is set to a threshold value. Then, the mask image is created. The threshold value is an average value of only the G channel of an image corresponding to one pixel in the captured image. Also in a case of RB channel, in a manner similar to that of the G channel, the mask image is created from the image data of the captured image.

3. Subsequently, the luminance data, which is normalized by a resolution×an area having a mask image value, is given to the obtained mask image, and is set as input data.

Figure 19:
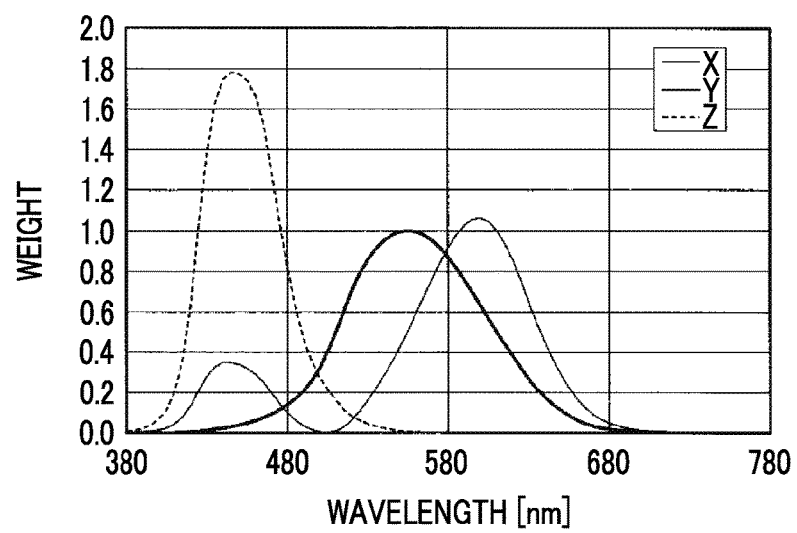
FIG. 19 is a graph illustrating an example of XYZ color matching functions applied to the present invention.

That is, a location of 1 of (0, 1) mask data of the mask image obtained in the section 2 is replaced with an integral value through the XYZ color matching functions shown in FIG. 19 in the spectrum data obtained in the section 1. For example, if the input data of the G sub-pixel is intended to be created, a product (G×Y) between the spectrum data G of G shown in FIG. 18B and the spectrum data Y of the luminance Y of the XYZ color matching function shown in FIG. 19 may be acquired. In addition, if the input data of the B sub-pixel is intended to be created, a product (B×Y) between the spectrum data B of B and the spectrum data Y of the luminance Y of the XYZ color matching function shown in FIG. 19 may be acquired. Likewise, the input data of the R sub-pixel may be created. At this time, the calculated luminance value (luminance data) Y is proportional to an opening area (area having the mask image value) of the sub-pixels and the number of pixels (resolution) included in a sensor of the spectrometer, and is therefore normalized by the number of pixels×the opening area, that is, the resolution×the area having the mask image value. The reason for this is that a macro luminance can be regarded as a value which is obtained by multiplying the opening area of the sub-pixels by the number of pixels included in the sensor in a case where the sub-pixels are regarded as a set of infinitesimal light sources.

Figure 18C:
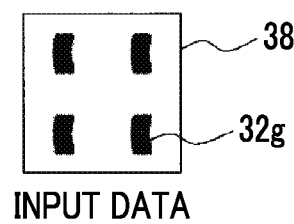
FIG. 18C is a schematic diagram illustrating an example of input data of 2×2 pixels.

Subsequently, in step S36, the resolution of the microscope image is different from desired input data (12700 dpi). Therefore, the input data pieces of the RGB sub-pixels obtained in step S34 each are expanded and compressed (reduced) in a bicubic method, the display luminance of the present example is normalized to 1.0 in step S38, and display BM data (normalized luminance image data) is created as input data of 2 pixels×2 pixels shown in FIG. 18C.

In such a manner, it is possible to acquire the display BM data.

The display BM data, which is obtained in such a manner, becomes normalized luminance image data which is normalized on the basis of the luminance of the reference display. Therefore, even compared with another display, the comparison can be performed on the basis of absolute values.

Meanwhile, before the two-dimensional fast Fourier transform (2DFFT (base 2)) is performed on the display BM data, it is preferable that input data of 2 pixels×2 pixels is repeatedly copied by an integer multiple approximate to an image size of 20000 pix×20000 pix, and thereby the normalized luminance image data is created as input data for moiré evaluation.

It should be noted that the input data pieces of the RGB sub-pixels obtained in step S34 each may be set at a resolution of 12700 dpi which is a high resolution through bilinear interpolation, without creation of the input data of 2 pixels×2 pixels, and an image size thereof may be bicubic-converted into 109 pix (pixels)×109 pix (pixels). It should be noted that, if the resolution of the optical imaging system is given, it is possible to calculate the values in accordance with the resolution.

Subsequently, the normalized luminance image, of which the image size is 109 pix×109 pix, with the resolution of 12700 dpi is repeatedly copied by an integer multiple (183 times) approximate to an image size of 20000 pix×20000 pix for each color of RGB, and thereby the normalized luminance image data as input data for moiré evaluation may be created.

The method of acquiring the display BM data (normalized luminance image data) indicating the RGB luminance pixel information by capturing images of the RGB sub-pixel array patterns of the display unit 30 is not limited to the method of measuring spectra of the respective sub-pixel images through the above-mentioned spectrometer and performing luminance conversion on the basis of the measured spectrum data. The captured image data may be directly converted into luminance values of the respective colors (RGB).

For example, on the basis of captured image data of the captured image of the sub-pixel array pattern of each color, a luminance value of each color (RGB) is converted, and luminance data (total three data pieces) of RGB is created on the basis of a luminance of the display=1.0.

Assuming that red image data is R, green image data is G, blue image data is B, and the luminance value is Y, for conversion from the captured image into the luminance value, Y (luminance value) is calculated through the following conversion Expression (2), and R, G, and B color filter images (luminance ratio images) are created.

$$Y=0.300R+0.590G+0.110B \quad (2)$$

The maximum value of the G sub-pixel (color filter) image (luminance ratio image) obtained in such a manner is 1.0 (=0.25*255), that is, the luminance images of the R, G, and B sub-pixels as references are normalized. Thereby, a normalized luminance image (image data) of each of the RGB sub-pixels can be created.

Next, in process 2, an image (transmittance image data) of a combined mesh pattern of the upper and lower mesh-shaped wiring patterns 24a and 24b is created. In addition, as described above, in a case where one side surface has the mesh-shaped wiring pattern and the other side surface has a wiring pattern using a transparent conductive layer such as ITO, an image of a combined mesh pattern of both of those is an image of the mesh-shaped wiring pattern on one side surface. Consequently, in this case, the transmittance image data of the combined wiring pattern is created such that values of the transmittance image data of the wiring pattern using the transparent conductive layer are 0 as a whole.

As shown in FIG. 16, in step S12, the transmittance image data of the combined mesh pattern is created. That is, the transmittance image data of the regular rhomboid wiring patterns 25b (thin metal lines 14) (refer to FIG. 3) as the upper and lower mesh-shaped wiring patterns 24a and 24b is created and acquired, and synthetic transmittance image data of a combined wiring (mesh) pattern, in which the upper and lower mesh-shaped wiring patterns 24a and 24b overlap with each other, is created on the basis of the respective acquired transmittance image data pieces. In addition, at least one transmittance image data piece of the combined mesh pattern, that is, the mesh-shaped wiring patterns 24a and 24b may be provided or stored in advance. In this case, transmittance image data may be acquired from the provided or stored transmittance image data.

The regular rhomboid mesh pattern 25b is, for example, as shown in FIG. 3, a rhomboid pattern in which a predetermined angle of the thin metal lines 14 as wiring with respect to the horizontal line is set. For example, the angle may be set to be less than 45° [deg].

Further, when the transmittance image data of the rhomboid mesh pattern and the transmittance image data of the combined mesh pattern are created, a resolution thereof is set to, for example, 25400 dpi. In addition, the size of the transmittance image data is defined such that the pixel size is set as, for example, an integer multiple of the size (for example, 109 pix×109 pix) of a cyclic unit approximate to 20000 pix×20000 pix, similarly to the BM pattern 38. In such a manner, the transmittance image data can be created with the defined size.

Next, in process 3, by performing two-dimensional fast Fourier transform (2DFFT (base 2)) on each of the normalized luminance image data of the sub-pixels created in process 1 (step S10) and the transmittance image data of the combined mesh pattern created in process 2 (step S12), a spatial frequency of the spectrum peak and a peak spectrum intensity are calculated.

That is, as shown in FIG. 16, in step S14, first, by performing 2DFFT (the image size is 20000 pix×20000 pix) on the transmittance image data of the combined mesh pattern and the luminance image data of the sub-pixel array pattern (BM pattern) of each color of the BM pattern 38 for each color of RGB, Fourier spectra are calculated. Here, it is preferable that normalization is performed such that an intensity of a DC (direct current) component is an average value of an image.

First, the peak frequency and the peak intensity are obtained by performing 2DFFT on the luminance image data for moiré evaluation obtained in step S10. Here, the peak intensity is treated as an absolute value of the Fourier spectrum.

This process is repeatedly performed for each color of RGB. At this time, if all small intensities not contributing to moiré are used, there is concern that calculation may become complicated and accuracy thereof may not be correctly evaluated. Therefore, it is preferable to provide a threshold value on the basis of the intensity. For example, in a case where the absolute value of the spectrum intensity is represented as a common logarithm, it is preferable to employ a value which is larger than −2.2 ($\log_{10}$(intensity)>−2.2).

Figure 20A:
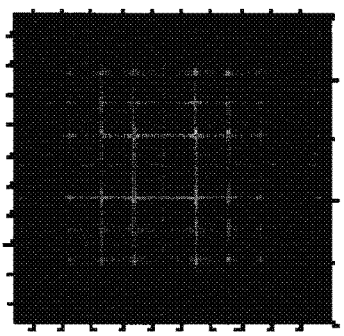
FIGS. 20A and 20B are respectively diagrams illustrating intensity characteristics of two-dimensional Fourier spectra of respective transmittance image data pieces of the pixel array pattern shown in FIG. 15A and the wiring pattern shown in FIG. 1.

FIG. 20A shows an example of intensity characteristics of two-dimensional Fourier spectrum of the luminance image data of the G color (sub-pixel array pattern) obtained in such a manner.

Subsequently, by performing the 2DFFT on the respective transmittance image data pieces of the combined mesh pattern created in such a manner, the peak frequency and the peak intensity of the plurality of spectrum peaks of the two-dimensional Fourier spectra of the respective transmittance image data pieces of the combined mesh pattern are calculated. Here, the peak intensity is treated as an absolute value. For simplification of calculation, for example, in a case where the absolute value of the spectrum intensity is represented as a common logarithm, it is preferable that, only a threshold value of the intensity greater than −2.0 is treated.

Figure 20B:
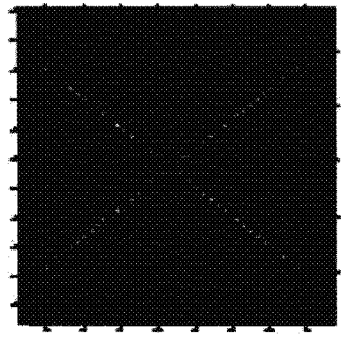

FIG. 20B shows an example of intensity characteristics of the two-dimensional Fourier spectra of the respective transmittance image data pieces of the combined mesh pattern obtained in such a manner.

In a case of changing a point of view, a spatial frequency of the mesh of the combined mesh pattern, an intensity thereof, and a spectrum intensity of the BM are different from those in the front view. For example, if the point of view for the combined mesh pattern is set at 30°, an amount of deviation between the upper mesh pattern and the lower mesh pattern may be set in consideration of a substrate thickness (for example, PET: 100 μm). The spectrum intensity of the BM may be 0.9 times the intensity thereof in the front view.

As described above, FIGS. 20A and 20B are respectively diagrams illustrating the intensity characteristics of the two-dimensional Fourier spectra of the respective transmittance image data pieces of the combined mesh pattern and the luminance image data of the G color (sub-pixel array pattern) of the BM pattern 38.

In FIGS. 20A and 20B, white portions have high intensities, and indicate spectrum peaks. Therefore, from the results shown in FIGS. 20A and 20B, the peak frequencies and the peak intensities of spectrum peaks are calculated respectively for the transmittance image data of the combined mesh pattern and the luminance data of the BM pattern 38 at the time of lighting on for each color depending on the sub-pixel array patterns of three colors such as RGB of the BM pattern 38. In other words, positions of the spectrum peaks on frequency coordinates in the intensity characteristics of the two-dimensional Fourier spectra of the transmittance image data of the combined mesh pattern and the luminance data of the BM pattern 38 (the sub-pixel array pattern of each color) respectively shown in FIGS. 20A and 20B, that is, the peak positions indicate peak frequencies. The intensities of the two-dimensional Fourier spectra at the peak positions indicate peak intensities.

Here, the peak frequencies and the peak intensities of the spectrum peaks of the combined mesh pattern and each sub-pixel array pattern of the BM pattern 38 are calculated and acquired in a manner similar to that of the following description. Hereinafter, summary thereof will be described. In addition, hereinafter, the luminance data of the BM pattern 38 (the sub-pixel array pattern of each color) at the time of lighting on for each color is simply referred to as each sub-pixel array pattern of the BM pattern 38 represented as the luminance data. The transmittance image data of the combined mesh pattern is simply referred to as the combined mesh pattern represented as the transmittance image data.

Figure 21:
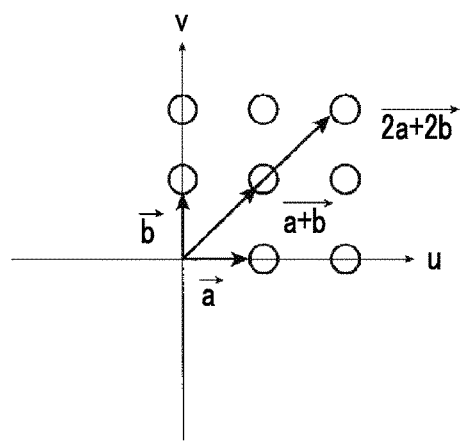
FIG. 21 is a graph illustrating a frequency peak position of the pixel array pattern of the display unit shown in FIG. 15A.

First, for peak calculation, the frequency peaks are obtained from basic frequencies of the combined mesh pattern and the sub-pixel array patterns of the BM pattern 38. The reason for this is that, since the luminance image data and the transmittance image data for performing the 2DFFT processing are discrete values, the peak frequency depends on an inverse of the image size. As shown in FIG. 21, each frequency peak position can be represented by combination based on a bar and b bar as independent two-dimensional fundamental frequency vector components. Consequently, it is apparent that the obtained peak positions have a lattice shape.

Figure 22A:
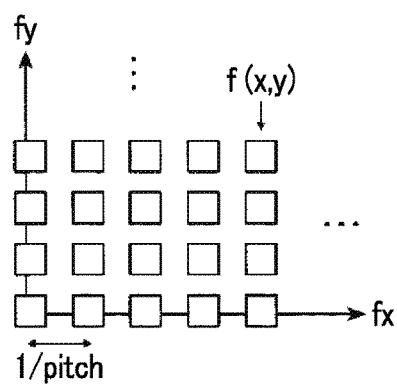
FIG. 22A is a graph illustrating a frequency peak position of an input pattern image.

That is, as shown in FIG. 22A, the positions of the spectrum peaks of the combined mesh pattern and the sub-pixel array patterns of the BM pattern 38 on the frequency coordinates fxfy, that is, the peak positions are given as positions of points having a lattice shape on the frequency coordinates fxfy in which an inverse (1/p (pitch)) of the pattern pitch is set as a lattice interval.

In addition, FIG. 21 is a graph illustrating the frequency peak positions in the case of the sub-pixel array pattern of the G color in the BM pattern 38 at the time of emitting G-color light, and the frequency peak positions in a case of the combined mesh pattern can also be obtained in a manner similar to that in the above description.

Figure 23A:
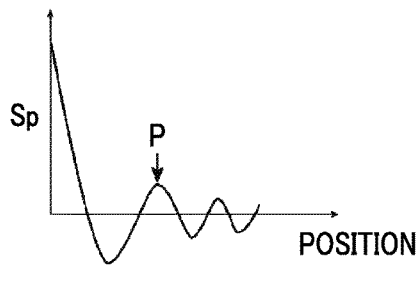
FIGS. 23A and 23B are respectively a graph in which exemplary intensity characteristics of two-dimensional Fourier spectrum are represented by a curve and a bargraph in which the intensity characteristics are represented by bars.
Figure 23B:
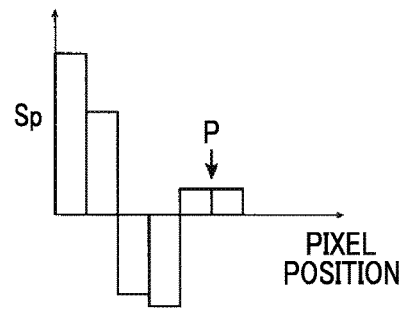

In contrast, in the process of acquiring the peak intensities, the peak positions are obtained by acquiring the peak frequencies, and thus the intensities (absolute values) of the two-dimensional Fourier spectra at the peak positions are obtained. At that time, FFT processing is performed on digital data, and thus in some cases, the peak position may be between a plurality of pixels. For example, when intensity (Sp) characteristics of the two-dimensional Fourier spectrum are represented by the curve (analog value) shown in FIG. 23A, intensity characteristics of the two-dimensional Fourier spectrum subjected to the digital processing are represented by a bargraph (digital values) shown in FIG. 23B. A peak P of the intensity of the two-dimensional Fourier spectrum shown in FIG. 23A is between two pixels in corresponding FIG. 23B.

Figure 22B:
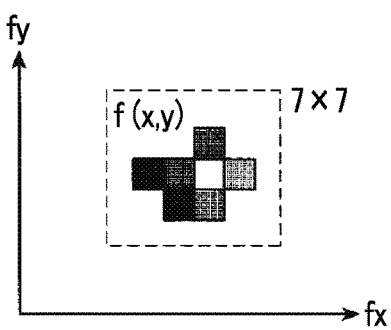
FIG. 22B is a graph illustrating calculation of a peak intensity at the frequency peak position.

Accordingly, if the intensity present at the peak position is intended to be acquired, as shown in FIG. 22B, it is preferable that the peak intensity is the sum of the intensities (absolute values) having highest ranks at a plurality of points among spectrum intensities of a plurality of pixels within a region including a plurality of pixels around the peak position, for example, the sum of the intensities having highest ranks at five points among spectrum intensities of the pixels within a region of 7×7 pixels.

Here, it is preferable that the obtained peak intensity is normalized by the image area (image size). For example, it is preferable that the intensity is normalized by the above-mentioned image size (Parseval's theorem).

Next, in process 4, a spatial frequency and an intensity of moiré are calculated from the peak frequencies and the peak intensities of the transmittance image date of the combined mesh pattern and the peak frequencies and the peak intensities of the luminance data of the BM pattern 38 at the time of lighting on for each color of RGB obtained in process 3 (step S14).

Specifically, as shown in FIG. 16, in step S16, the frequencies and the intensities of moirés for respective colors are calculated from the peak frequencies and the peak intensities of both two-dimensional Fourier spectra of the mesh pattern and the sub-pixel array patterns of the respective RGB colors of the BM pattern 38 respectively calculated in step S14. Here, the peak intensities and the intensities of moiré s are also treated as absolute values.

Here, spatial frequencies and intensities of moirés can be calculated through a convolution operation of the peak frequencies and the peak intensities of the sub-pixel array patterns of the respective RGB colors of the peak frequency and the peak intensity of the mesh pattern.

In real space, moiré is caused by multiplication of the image data pieces (the transmittance image data and the luminance image data) of the combined mesh pattern of the conductive film 10 and the sub-pixel array pattern of the BM pattern 38 at the time of lighting on for each color. Thus, in frequency space, both image data pieces are subjected to convolution integration (convolution). However, in steps S14 and S16, the peak frequencies and the peak intensities of both two-dimensional Fourier spectra of the combined mesh pattern and the sub-pixel array pattern of each color of the BM pattern 38 are calculated. Therefore, a difference (an absolute value of a difference) between both frequency peaks of the combined mesh pattern and the sub-pixel array pattern of a single color of RGB is obtained, the obtained difference is set as a frequency of moiré, a product between two sets of vector intensities obtained by combining both is obtained, and the obtained product is set as an intensity (absolute value) of moiré.

The frequency of moiré and the intensity of moiré are obtained for each color of RGB.

Here, the difference between the frequency peaks of the intensity characteristics of both two-dimensional Fourier spectra of the combined mesh pattern and the sub-pixel array pattern of each color of the BM pattern 38 respectively shown in FIGS. 20A and 20B corresponds to a relative distance between the peak positions of both frequency peaks on the frequency coordinates, in intensity characteristics obtained by superimposing the intensity characteristics of both two-dimensional Fourier spectra for each color.

A plurality of spectrum peaks of both two-dimensional Fourier spectra between the combined mesh pattern and the sub-pixel array pattern of each color of the BM pattern 38 is present for each color. Therefore, a plurality of the differences between the frequency peaks which are values of the relative distances, that is, a plurality of the frequencies of moiré is obtained. Consequently, if there are multiple spectrum peaks of both two-dimensional Fourier spectra, there are multiple obtained frequencies of moiré, and thus there are multiple obtained intensities of moiré.

However, in a case where the intensities of moiré at the obtained frequencies of moiré are weak, moiré is not visually perceived. Thus, it is preferable to deal with only moiré of which the intensity of moiré is regarded to be weak and is equal to or greater than a predetermined value, for example, moiré of which the intensity is equal to or greater than −4.5.

Here, in the display device, the display resolution is determined, thus the highest frequency, at which display can be performed on the display device, is determined depending on the resolution thereof. Hence, moiré having a frequency higher than the highest frequency is not displayed on the display device, and therefore it is not necessary to set the moiré as an evaluation target in the present invention. Accordingly, the highest frequency of moiré can be defined in accordance with the display resolution. Here, the highest frequency of moiré, which has to be considered in the present invention, can be set to 1000/Pd (cycle/mm) when the pixel pitch of the pixel array pattern of the display is Pd (μm).

From the above description, in the present invention, in the frequencies and the intensities of moiré obtained from the spectrum peaks of both two-dimensional Fourier spectra, moiré as the evaluation (quantification) target in the present invention is moiré, of which a frequency is equal to or less than the highest frequency of moiré of 1000/Pd defined in accordance with the target display resolution (for example, 151 dpi in the present example), and moiré of which an intensity of moiré is equal to or greater than −4.5. In the present invention, the reason why moiré having the intensity of moiré equal to or greater than −4.5 is set as a target is as follows. If multiple moirés of which the intensity is less than −4.5 occur and thus the sum thereof is used, even originally invisible moiré may have to be scored. For this reason, in the present invention, a threshold value, which is equal to or greater than −4.5, is provided from an empirical visibility limit.

Next, in process 5, moiré is quantified using the frequency and the intensity of moiré for each sub-pixel of each color of RGB calculated in process 4 (step S16), and a quantitative value as an indicator of evaluation of moiré is obtained.

That is, as shown in FIG. 16, in step S18, convolution of the visual transfer function (VTF) and the spectrum peaks for moiré evaluation remaining in step S16 is performed, and quantified.

Before quantification of moiré, if there are multiple spectrum peaks of both two-dimensional Fourier spectra, there are multiple obtained frequencies of moiré, and thus it takes time to perform calculation processing. In such a case, the spectrum peaks of both two-dimensional Fourier spectra are provided in advance, spectrum peaks having weak peak intensities may be excluded, and only spectrum peaks having certain strong intensities may be selected. In that case, only the differences between the selected peaks are obtained, and thus it is possible to shorten the calculation time.

For example, as a target, convolution of the moiré spectrum and a visual transfer function (VTF) (the VTF is set to 1.0 in a low frequency region less than a frequency at which the VTF has the maximum value, but the 0 frequency component is set to 0) at the observation distance of 400 mm is performed, and thereafter it is possible to deal with only moirés with an intensity of −3.8 or more.

Here, in order to extract only moirés which are visually perceived through human eyes, the VTF corresponding to the observation distance of 400 mm is used on the basis of scattering effects in a system.

The spectrum peaks, which remain in such a manner, can be set as spectrum peaks for moiré evaluation. At this time, it is preferable that only peaks equal to or greater than −3.8 as a common logarithm are used as the spectrum intensities. Thereby, it is possible to extract perceived moirés.

Figure 24:
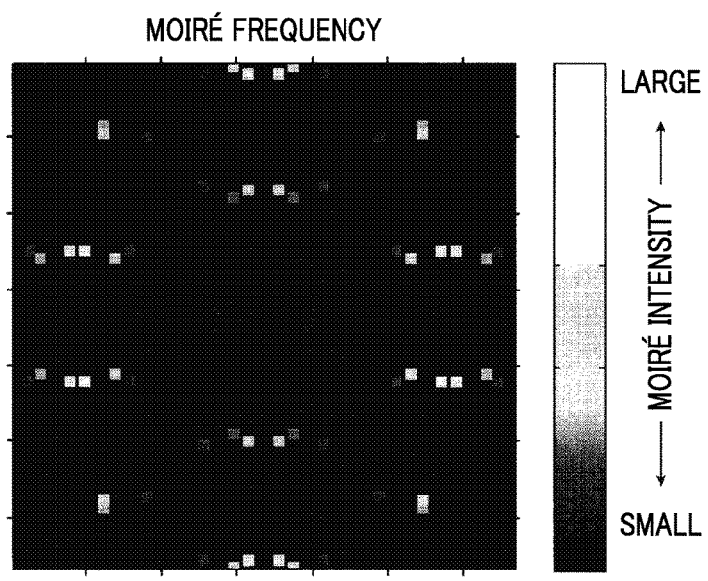
FIG. 24 is a schematic explanatory diagram schematically illustrating frequencies of moiré and intensities of moiré caused by interference between the pixel array pattern shown in FIG. 15A and the wiring pattern shown in FIG. 1.

FIG. 24 shows frequencies of moiré and intensities of moiré obtained in such a manner. FIG. 24 is a schematic explanatory diagram schematically illustrating the frequencies of moiré and the intensities of moiré caused by interference between the pixel array pattern shown in FIG. 15A and the wiring pattern shown in FIGS. 1 and 2. Those may be results of convolution integration of intensity characteristics of the two-dimensional Fourier spectra shown in FIGS. 20A and 20B.

In FIG. 24, the frequencies of moiré are represented by position on the vertical and lateral axes, and the intensities of moiré are represented by gray (achromatic color) density, where as the thickness of the color decreases and the color becomes white, the frequency increases.

In the quantification of moiré, specifically, in step S18, in the frequencies and the intensities (absolute values) of moirés for the sub-pixels of the respective colors of RGB obtained in step S16, a plurality of evaluation values of moirés of the respective colors is calculated by applying human visual response characteristics (VTF) corresponding to the observation distance of 750 mm as an example of human visual response characteristics represented by the following Expression (1), that is, by performing convolution integration. Here, in order to score moiré, the VTF corresponding to the observation distance of 750 mm is used.

$$\text{VTF} = 5.05 e^{-0.138\,k}(1 - e^{0.1\,k}) \quad (1)$$

$$k = \pi d u / 180$$

Here, k is a spatial frequency (cycle/deg) defined by a solid angle, u shown in the above-mentioned Expression (1) is a spatial frequency (cycle/mm) defined by a length, and d is defined by an observation distance (mm).

The visual transfer function represented in the above-mentioned Expression (1) is called a Dooley-Shaw function, and is obtained with reference to description of a reference (R. P. Dooley, R. Shaw: Noise Perception in Electrophotography, J. Appl. Photogr. Eng., 5, 4 (1979), pp. 190-196.).

In such a manner, it is possible to obtain the evaluation value of moiré using a common logarithm of the intensity for each color of RGB.

Here, the above-mentioned steps S10 to S18 are repeated for each color of RGB, and the evaluation values of moirés of RGB may be obtained. However, in each step of the above-mentioned steps S10 to S18, the calculation may be performed for each color of RGB.

A worst value, that is, a maximum value among the evaluation values of moirés of RGB obtained in such a manner is set as the indicator of evaluation (quantitative value) of moiré. A value of the indicator of evaluation of moirés is obtained as a value (common logarithm value) of a common logarithm of the indicator of evaluation of moirés represented by a common logarithm is obtained. It is preferable that evaluation is also performed by combining an evaluation image with RGB display in accordance with calculation of the worst value.

It can be said that the quantitative value of moiré, which is the indicator of evaluation of moiré, is a value of quantification of moiré and noise in the related art. In the present invention, noise is defined as a state in which a lot of moirés are present. Accordingly, in the present invention, if there is a peak in a single frequency, it is determined that moiré is present. In contrast, if there is a plurality of peaks in the vicinity of a single frequency, it is determined that noise is present.

The above-mentioned indicator of evaluation of moiré is obtained in a case where the conductive film 10 laminated on the display screen of the display unit 30 of the display 40 is observed from the front of the display screen. However, the present invention is not limited to this, and the indicator of evaluation of moiré in a case where observation is performed in a direction oblique to the front may be obtained.

In the case where the indicator of evaluation of moiré is obtained in a case where observation is performed in a direction oblique to the front, the intensities of RGB of the display 40 at the time of oblique observation are calculated at 90% of the luminance at the time of front observation, the process returns to step S14, and the peak frequencies and the peak intensities of the Fourier spectra of the respective colors are calculated again. Thereafter, steps S16 to S18 are repeated in a similar manner, and the indicator of evaluation of moiré at the time of oblique observation is calculated.

In such a manner, if the indicators of evaluation of moiré are calculated at the time of front observation and oblique observation, a large value (worst value) among the indicators of evaluation of moiré at the time of front observation and oblique observation is calculated as the indicator of evaluation of moiré to be provided for moiré evaluation.

In a case where only one of the front observation and the oblique observation is not performed, the indicator of evaluation of moiré at the front observation or the oblique observation is set as the indicator of evaluation of moiré to be directly provided for moiré evaluation.

Next, in process 6, evaluation of the wiring pattern is performed on the basis of the indicator of evaluation (quantitative value: worst value) of moiré calculated in process 5 (step S24).

That is, as shown in FIG. 16, in step S20, if a common logarithm value of the indicator of evaluation of moiré of the current combined mesh pattern obtained in step S18 is equal to or less than a predetermined evaluation threshold value, it is evaluated that the rhomboid mesh patterns constituting the current combined mesh pattern are optimized rhomboid mesh patterns applied to the conductive film 10 of the present invention, and the rhomboid mesh patterns are set as the optimized rhomboid mesh patterns 25b shown in FIG. 3.

It should be noted that the reason why the value of the indicator of evaluation of moiré is limited to be equal to or less than the predetermined evaluation threshold value as a common logarithm is as follows. If the value is greater than the predetermined evaluation threshold value, when the random mesh patterns 25a having a degree of randomicity equal to or less than the predetermined threshold value as shown in FIG. 2 are used as the wiring patterns by making the optimized rhomboid mesh patterns 25b wavy, moiré, which is caused by interference between each sub-pixel array pattern of the BM pattern and the wiring pattern overlapping with each other, is visually perceived, and the visually perceived moiré is recognized as deterioration by a user who observes the moiré, and offers a sense of discomfort to the user. In a case where the value of the indicator of evaluation of moiré is equal to or less than the predetermined evaluation threshold value, the moiré does not matter even when recognized as deterioration.

Here, the predetermined evaluation threshold value is appropriately set in accordance with shapes and properties of the conductive film and the display device. Specifically, the shapes and properties includes a line width of the thin metal line 14 of the mesh pattern 25b, a shape, an angle, and a size (such a pitch) of the opening portion 22, a phase angle (a rotation angle, and a deviation angle) of the wiring pattern of two wiring layers, a shape, a size (such a pitch), and an arrangement angle of the BM pattern 38, and the like. However, for example, the predetermined value is preferably equal to or less than $-3.00$ ($10^{-3.00}$ as an antilogarithm) as a common logarithm. That is, for example, the indicator of evaluation of moiré is preferably equal to or less than $-3.00$ ($10^{-3.00}$ as an antilogarithm) as a common logarithm.

Although described in detail later, the indicator of evaluation of moiré is obtained for each of the multiple combined mesh patterns each of which is formed by overlapping various regular rhomboid mesh patterns 25b. Thereafter, the combined mesh pattern, which is randomized, is formed of the mesh patterns 25a which have a degree of randomicity equal to or less than the predetermined threshold value by making at least one of the mesh patterns 25b wavy. Then, three functional evaluators perform functional evaluation on moiré, which is caused by interference between the randomized combined mesh pattern and the sub-pixel array pattern of each color of three colors such as RGB of the BM pattern, with their own eyes. If the indicator of evaluation of moiré is equal to or less than $-3.00$ as a common logarithm, in a state where the display is lit on, in terms of visibility of moiré which is caused by interference between the superposed combined mesh pattern and the sub-pixel array pattern of each color of three colors such as RGB of the BM pattern, a level of the moiré is better than a level of moiré which does not matter even when recognized as deterioration.

Consequently, in the combined mesh pattern optimized in the present invention and the rhomboid mesh patterns 25b as components thereof, the indicator of evaluation of moiré is preferably specified to be equal to or less than $-3.00$ ($10^{-3.00}$ as an antilogarithm) as a common logarithm.

It is apparent that a plurality of optimized mesh patterns 25b is obtained in accordance with the line width of the thin metal line 14 of the mesh pattern 25b, the shape of the opening portion 22, the size (pitch and angle), a phase angle (a rotation angle, and a deviation angle) of the mesh pattern 25b of two wiring layers, and the like. Here, a mesh pattern 25b having a small common logarithm value of the indicator of evaluation of moiré may be a best mesh pattern 25b, and the plurality of optimized mesh patterns 25b may be prioritized.

Next, in process 7, each optimized rhomboid mesh pattern, which is set in process 6 (step S20) is made to be irregular.

As shown in FIG. 16, in step S22, angles of the rhomboid shapes of the optimized rhomboid mesh (wiring) pattern 25b which is set in step S20 and shown in FIG. 3 are made to be irregular in a predetermined range, whereby the wiring pattern 25a shown in FIG. 2 is obtained, and is determined and evaluated as a wiring pattern of the conductive film of the present invention.

Here, application of predetermined irregularity in step S22 can be performed as follows.

First, the optimized wiring pattern 25b shown in FIG. 3 is made to be irregular in a predetermined manner by deforming thin metal lines 14 in a shape of wavy lines with a predetermined amplitude $A_0$, a predetermined wavelength $\lambda$, and a predetermined phase $\alpha$. As a result, it is possible to obtain a wavy wiring pattern 25a which is randomized as shown in FIG. 2.

At this time, each center line of the wavy lines of the thin metal lines 14, which constitute the wavy wiring pattern 25a shown in FIG. 2, coincides with each straight line of the thin metal lines 14 of the optimized wiring pattern 25b shown in FIG. 3. Accordingly, the opening portions (cells), which are formed by the center lines of the wavy lines of the wavy wiring pattern 25a, coincide with the opening portions 22c of the rhomboid shapes of the optimized wiring pattern 25b shown in FIG. 3. Therefore, the opening portions 22 of the wavy wiring pattern 25a have shapes the same as shapes of the respective sides of the opening portions 22c having the rhomboid shapes made as wavy lines.

In the present invention, irregularity is defined by proportions (%) of the amplitude $A_0$, the wavelength $\lambda$, and the phase $\alpha$ of each wavy line of the wavy wiring pattern 25a, which is made to be irregular, to the pitch of each rhomboid shape of the opening portion 22c of the optimized rhomboid wiring pattern 25b, that is, the rhomboid shape which is not made to be irregular.

In the present invention, a predetermined limit range of the irregularity defined as described above is preferably a range in which the amplitude $A_0$ of the wavy line is equal to or greater than 2.0% and equal to or less than 20% of the pitch of the rhomboid of the optimized rhomboid wiring pattern 25b.

Here, the reason why the irregularity is limited in the predetermined limit range is as follows. In the limit range, occurrence of moiré is further suppressed, and image quality can be further improved in terms of visibility of moiré, and occurrence of moiré can be further suppressed even in a case where the overlapping BM patterns are slightly changed. As a result, it is possible to maintain excellent performance in terms of visibility of moiré. However, if the irregularity is out of the limit range, it is not possible to obtain the effect of application of the irregularity.

The application of the predetermined irregularity in step S20 can be performed as described above.

In such a manner, the method of evaluating the wiring patterns on the conductive film of the present invention is terminated, and the wiring patterns of the conductive film of the present invention can be evaluated and determined.

As a result, the BM pattern of the display unit of the display device in a state of lighting on is superposed such that occurrence of moiré is suppressed. Thus, also for the display device with a different resolution, it is possible to provide the conductive film of the present invention which is excellent in visibility of moiré regardless of the observation distance and has the wiring pattern which is optimized, thereafter made to be irregular.

In the present invention, the optimized wiring pattern, which is optimized with respect to the predetermined BM pattern, is further made to be irregular in the above-mentioned predetermined range. Therefore, occurrence of moiré is further suppressed, and image quality becomes further excellent in terms of visibility of moiré. Even in a case where the BM patterns overlapping each other slightly change, it is possible to suppress occurrence of moiré, and it is possible to maintain excellent performance in terms of visibility of moiré.

Hereinbefore, the conductive film according to the present invention, the display device comprising the conductive film, and the method of evaluating the patterns of the conductive film have been described with reference to various embodiments and examples. However, it is apparent that the present invention is not limited to the embodiments and the examples and may be improved or modified in various forms without departing from the scope of the present invention.

EXAMPLES

Examples

Hereinafter, the present invention will be described in detail on the basis of examples.

In the present example, in accordance with the flow of the method of evaluating the conductive film of the present invention shown in FIGS. 16 and 17, in a manner similar to the above description, an experiment was performed as follows.

Before a plurality of the pixel array (BM) patterns 38 of the display that have BM structures Nos. 1 to 6 having different resolutions and different sub-pixel shapes typified by the G sub-pixel array patterns shown in FIGS. 15A to 15F and that emits light with different emission intensities are made to be irregular, multiple mesh patterns 25b that have rhomboid pattern shapes shown in FIG. 3, have the different shapes and sizes (pitches p and angles $\theta$) of the opening portions, and have different line widths of the thin metal lines (mesh) are provided as simulation samples, and the combined mesh pattern and the BM pattern of each color overlap with each other. With such a configuration, the quantitative value of moiré as the indicator of evaluation of moiré was obtained. Here, the emission intensities were set to 1.0 times, 1.5 times, and 2.0 times the intensity normalized by a specific display to be described later.

In the mesh pattern 25b for which the indicators of evaluation of moirés were obtained in such a manner, the thin metal lines 14 were changed into wavy lines having different amplitudes $A_0$, wavelengths $\lambda$, and phases $\alpha$. Accordingly, a combined mesh pattern, which was formed of multiple wavy mesh pattern 25a having different randomicities and which was made to be wavy, and the BM pattern of each color were made to overlap with each other. Then, three functional evaluators performed functional evaluation on moiré, which is caused by interference between both overlapping patterns in a simulation image of moiré, with their eyes.

Here, as shown in FIG. 16, regarding evaluation of moiré, functional evaluation was performed in the following manner: the transmittance image data of the combined mesh pattern, which was made to be wavy, was superposed on the luminance image data of the sub-pixel array pattern of each color of the pixel array (BM) pattern used in step S14; the simulation image of moiré, in which a transmittance image is superposed on a luminance image, was created, and was displayed on the display; and the three functional evaluators observed the displayed simulation image.

Experiment number Nos. 1 to 24 indicate experiments based on 24 combinations of: the BM structures of the display (6 types of Nos. 1 to 6); emission intensities of the display (3 types of 1.0, 1.5, and 2.0 times the standard intensity); meshes and angles (3 types of combinations) of the mesh pattern; line widths (3 types) of the mesh pattern; and phases (3 types), wavelengths (3 types), and amplitudes (7 types) of the wavy lines of metal wires. Table 1 shows results of the above-mentioned experiments of experiment number Nos. 1 to 24.

Here, the functional evaluation results were obtained in the following manner. The moiré is evaluated on 5 levels of 1 to 5 indicating measures of deterioration of image quality (visibility of moiré). In a case where deterioration of visibility of moiré is observed and offers a strong sense of discomfort, the evaluation level is set to 1. In a case where deterioration of visibility of moiré is observed and offers a sense of discomfort, the evaluation level is set to 2. In a case where deterioration of visibility of moiré is observed and offers a weak sense of discomfort, the evaluation level is set to 3. In a case where deterioration of visibility of moiré is observed but does not offer a sense of discomfort, the evaluation level is set to 4. In a case where deterioration of visibility of moiré is not observed, the evaluation level is set to 5.

In the present invention, in terms of visibility of moiré, moiré is allowable if the evaluation level is equal to or greater than 4. However, it is preferable that the evaluation level is 5.

In the present example, regarding the rhomboid shapes of the opening portions 22c of the typical mesh pattern 25b, and accordingly, regarding the rhomboid shapes each formed by the center lines of the wavy lines of the four sides of each opening portion 22 of the wavy mesh pattern 25a, the pitch p was changed to 120 µm, 150 µm, and 180 µm, and the angle θ was changed to 30°, 35°, and 40°.

Further, the line width of the typical mesh pattern 25b and accordingly the wavy mesh pattern 25a was changed to 2 µm, 3 µm, and 4 µm.

For randomicity, the phase of the wavy line was changed to 100 µm, 300 µm, and 500 µm, and the wavelength of the wavy line was changed to 100 µm, 300 µm, and 500 µm. In addition, the amplitude of the wavy line was changed to 10%, 20%, and 30% of the pitch p of the rhomboid shapes of the typical mesh pattern 25b and accordingly the rhomboid shapes of the center lines of the wavy lines of the wavy mesh pattern 25a. Further, for randomicity, the phase and the wavelength of the wavy line was fixed to 100 µm, and only the amplitude of the wavy line was changed to 0% (no randomicity), 2.0%, 4.0%, 6.0%, 8.0%, and 10.0% of the pitch p.

It should be noted that resolutions of the display were respectively set to 149 dpi, 265 dpi, 265 dpi, 326 dpi, 384 dpi, and 440 dpi, in 6 types of BM patterns of Nos. 1 to 6 shown in FIGS. 15A to 15F.

Further, emission intensities of the display were changed to 1.0, 1.5, and 2.0 times the intensity which is normalized by the display LP101WX1(SL) (n3) (manufactured by LG Display Corp.).

For imaging the sub-pixel array pattern of each color of the pixel array (BM) pattern 38, only the G channel of the display LP101WX1(SL) (n3) (manufactured by LG Display Corp.) was turned on at a MAX intensity, and then imaging was performed. Here, STM6 (manufactured by OLYMPUS Corp.) was used as the microscope, UMPlanFI10x (manufactured by OLYMPUS Corp.) was used as the lens, and QIC-F-CLR-12-C (manufactured by QIMAGING Corp.) was used as the camera. Here, as the imaging conditions, for example, a gain was set to 1.0, and white balance (G, R, B) was set to (1.00, 2.17, 1.12). Further, the captured image was subjected to shading correction.

For measuring luminance, a USB2000+ manufactured by Ocean Optics and a diffuser plate (CC-3-UV-S manufactured by the same company) at the tip of the fiber were used, and the integration time period was set to 250 ms.

Calculation of the indicator of evaluation of moiré was performed as described above in the method shown in FIG. 16.

TABLE 1

| Experiment Number (No.) | BM Structure Number (No.) | BM Intensity | Mesh/Angle (µm/°) | Line Width (µm) | Wavy Line (%) Phase | Wavy Line (%) Wavelength | Wavy Line (%) Amplitude | Moiré Quantitative Value | Functional Evaluation Result | |
|---|---|---|---|---|---|---|---|---|---|---|
| 1 | 1 | 1 | 120/40 | 2 | 500 | 500 | 10 | −2.34 | 2 | Comparative Example |
| 2 | 1 | 1.5 | 150/35 | 3 | 300 | 300 | 20 | −2.39 | 2 | Comparative Example |
| 3 | 1 | 2 | 180/30 | 4 | 100 | 100 | 30 | −2.47 | 1 | Comparative Example |
| 4 | 2 | 1 | 120/40 | 3 | 300 | 300 | 30 | −4.28 | 3 | Comparative Example |
| 5 | 2 | 1.5 | 150/35 | 4 | 100 | 500 | 10 | −3.54 | 4 | Example |
| 6 | 2 | 2 | 180/30 | 2 | 500 | 300 | 20 | −3.16 | 4 | Example |
| 7 | 3 | 1 | 150/35 | 2 | 100 | 300 | 30 | −3.98 | 2 | Comparative Example |
| 8 | 3 | 1.5 | 180/30 | 3 | 500 | 100 | 10 | −2.99 | 3 | Comparative Example |
| 9 | 3 | 2 | 120/40 | 4 | 300 | 500 | 20 | −2.88 | 3 | Comparative Example |
| 10 | 4 | 1 | 180/30 | 4 | 300 | 300 | 10 | −3.34 | 4 | Example |
| 11 | 4 | 1.5 | 120/40 | 2 | 100 | 100 | 20 | −3.08 | 4 | Example |
| 12 | 4 | 2 | 150/35 | 3 | 500 | 500 | 30 | −2.98 | 3 | Comparative Example |
| 13 | 5 | 1 | 150/35 | 4 | 500 | 100 | 20 | −4.44 | 4 | Example |
| 14 | 5 | 1.5 | 180/30 | 2 | 300 | 500 | 30 | −3.92 | 3 | Comparative Example |
| 15 | 5 | 2 | 120/40 | 3 | 100 | 300 | 10 | −2.99 | 2 | Comparative Example |
| 16 | 6 | 1 | 180/30 | 3 | 100 | 500 | 20 | −3.68 | 4 | Example |
| 17 | 6 | 1.5 | 120/40 | 4 | 500 | 300 | 30 | −2.53 | 1 | Comparative Example |
| 18 | 6 | 2 | 150/35 | 2 | 300 | 100 | 10 | −4.33 | 4 | Example |
| 19 | 4 | 1.5 | 120/40 | 2 | 100 | 100 | 0 | −3.08 | 3 | Comparative Example |

TABLE 1-continued

| | | | Factor Column | | | | | | | |
|---|---|---|---|---|---|---|---|---|---|---|
| | BM | | Mesh | | | | | | | |
| | BM | | Pattern | | | | | Moiré | Functional | |
| Experiment Number | Structure Number | BM | Mesh/ Angle | Line Width | Wavy Line (%) | | | Quantitative Value | Evaluation Result | |
| (No.) | (No.) | Intensity | (μm/°) | (μm) | Phase | Wavelength | Amplitude | | | |
| 20 | 4 | 1.5 | 120/40 | 2 | 100 | 100 | 2 | −3.08 | 4 | Example |
| 21 | 4 | 1.5 | 120/40 | 2 | 100 | 100 | 4 | −3.08 | 4 | Example |
| 22 | 4 | 1.5 | 120/40 | 2 | 100 | 100 | 6 | −3.08 | 4 | Example |
| 23 | 4 | 1.5 | 120/40 | 2 | 100 | 100 | 8 | −3.08 | 4 | Example |
| 24 | 4 | 1.5 | 120/40 | 2 | 100 | 100 | 10 | −3.08 | 4 | Example |

As can be clearly seen from Table 1, the experiments of Nos. 5, 6, 10, 11, 13, 16, 18, and 20 to 24 are examples of the present invention in which the quantitative value of moiré is equal to or less than −3.00 and the amplitude is equal to or greater than 2.0% and equal to or less than 20%. In addition, it can be seen that, since the functional evaluation result as a measure of deterioration is 4, the visibility of moiré is favorable.

In contrast, the experiments of Nos. 1 to 4, 7 to 9, 12, 14, 15, 17, and 19 are comparative examples in which the quantitative value of moiré is greater than −3.00 and/or the amplitude is less than 2.0% and greater than 20%. It can be seen that, since the functional evaluation result as a measure of deterioration is equal to or less than 3, the visibility of moiré is poor, and moiré, which is recognized as deterioration and offers a sense of discomfort, is visually perceived.

As can be seen from the above, in the present example, there is no case where the functional evaluation result is 5, but the measure of deterioration is equal to or greater than 4. However, in cases where image quality is an acceptable level, the quantitative value of moiré is equal to or less than −3.00, and the amplitude is equal to or greater than 2.0% and equal to or less than 20%. It can be seen that, by satisfying such conditions, it is possible to improve image quality.

In the conductive film of the present invention having the combined wavy wiring pattern which is obtained by randomizing the combined rhomboid wiring pattern for allowing the quantitative value (indicator of evaluation) of moiré to satisfy the range, even if the cycles and the intensities of the BM patterns of the display, the emission intensity of the display, and the like are different, even at the time of front observation, and even at the time of oblique observation, it is possible to suppress occurrence of moiré, and it is possible to greatly improve visibility.

From the above description, effects of the present invention are clarified.

In the present invention, in a manner similar to that of the above-mentioned examples, wiring patterns having various pattern shapes are provided in advance, and thus it is possible to determine the conductive film that has wiring patterns including a randomized wiring pattern in which the entirety or a part of at least one of the upper and lower wiring patterns constituting the combined wiring pattern optimized in the evaluation method of the present invention is randomized. However, in a case where the indicator of evaluation of moiré for the single wiring pattern is less than a predetermined value, it is possible to determine the conductive film which has the optimized wiring pattern by repeating the following process: transmittance image data of the wiring pattern is updated to transmittance image data of a new wiring pattern, transmittance image data of a new combined wiring pattern is created, and the quantitative value (the indicator of evaluation) of moiré is obtained by applying the above-mentioned evaluation method of the present invention.

Here, the updated new wiring pattern may be provided in advance, and may be newly created. It should be noted that, in the case where the pattern is newly created, any one or more of the rotation angle, the pitch, and the pattern width of the transmittance image data of the wiring pattern may be changed, and the shape and the size of the opening portion of the wiring pattern may be changed. In the present invention, it is apparent that it is necessary to at least partially randomize at least one of the combined wiring patterns.

EXPLANATION OF REFERENCES 10, 11, 11A: conductive film
12: transparent substrate
14: thin line made of metal (thin metal line)
16, 16a, 16b: wiring portion
18, 18a, 18b: adhesive layer
20, 20a, 20b: protective layer
21: mesh wire
22: opening portion
17, 17a, 17b: electrode portion
24: combined wiring pattern
24a: first (upper) wiring pattern
24b: second (lower) wiring pattern
25a: irregular wavy wiring pattern
25b: regular typical rhomboid wiring pattern
26: dummy electrode portion
28, 28a, 28b: wiring layer
30: display unit
32, 32r, 32g, 32b: pixel
34: black matrix (BM)
38: BM pattern
40: display device
44: touch panel

What is claimed is:
1. A conductive film that is provided on a display unit of a display device, the conductive film comprising:
a transparent substrate; and
two wiring portions that are respectively formed on both sides or a single side of the transparent substrate,
wherein at least one wiring portion of the two wiring portions has a plurality of thin metal lines,

43 wherein the plurality of thin metal lines of at least one wiring portion of the two wiring portions has a wiring pattern which is formed of wavy lines so as to have irregularity, wherein the plurality of thin metal lines or center lines of the wavy lines have a polygonal wiring pattern formed in a mesh shape such that a plurality of polygonal opening portions is arranged on the wiring portion, wherein in the display unit, pixels, which include a plurality of sub-pixels emitting light with a plurality of colors that are at least three colors different from each other, are arranged in pixel array patterns, wherein the conductive film is provided on the display unit such that the wiring patterns of the two wiring portions overlap with the pixel array patterns of the display unit, wherein from at least one point of view, a wiring pattern, which is not made to be irregular, is a polygonal wiring pattern formed such that an indicator of evaluation of moirés is equal to or less than an evaluation threshold value, where in frequencies and intensities of the moirés of respective colors of a plurality of colors calculated from a first peak frequency and a first peak intensity of a plurality of first spectrum peaks of two-dimensional Fourier spectra of transmittance image data of regular polygonal wiring patterns which are not made to be irregular and a second peak frequency and a second peak intensity of a plurality of second spectrum peaks of two-dimensional Fourier spectra of luminance image data of the pixel array patterns of the respective colors when light beams with the plurality of colors are respectively emitted, the indicator of evaluation is calculated from evaluation values of the moirés of the respective colors obtained by applying human visual response characteristics in accordance with an observation distance to intensities of the moirés equal to or greater than a first intensity threshold value among intensities of the moirés at frequencies of the moirés equal to or less than a frequency threshold value defined on the basis of a display resolution of the display unit, and wherein the wiring pattern, which is made to be irregular, is a wavy wiring pattern in which the plurality of thin metal lines, which form a regular polygonal wiring pattern having the indicator of evaluation of moirés equal to or less than the evaluation threshold value, is formed as the wavy lines of which amplitudes are equal to or less than an amplitude threshold value.

2. The conductive film according to claim 1, wherein the irregularity of the wavy wiring pattern is made by amplitudes, wavelengths, and phases of the wavy lines constituting the plurality of thin metal lines.

3. The conductive film according to claim 1,
wherein the evaluation threshold value is −3.00, and
wherein the amplitude threshold value is 20% of a pitch of the regular polygonal wiring pattern.

4. The conductive film according to claim 1, wherein the polygonal shape is a rhomboid shape.

5. The conductive film according to claim 1, wherein the luminance image data of the pixel array patterns of the respective colors is normalized luminance data that is obtained by normalizing the luminance image data obtained by converting captured image data of the colors, which is obtained by capturing images of the pixel array patterns of the respective colors displayed on a display screen of the display unit, into luminance values, when the light beams with the plurality of colors are separately emitted.

44

6. The conductive film according to claim 5, wherein when the plurality of colors is three colors such as red, green, and blue, the captured image data of the images of the pixel array patterns of the respective colors such as red, green, and blue is image data that is obtained through imaging performed through white balance adjustment based on a white color of a Macbeth chart.

7. The conductive film according to claim 6, wherein when the plurality of colors is three colors such as red, green, and blue, the captured image data of the images of the pixel array patterns of the respective colors such as red, green, and blue is image data that is obtained through imaging performed through white balance adjustment based on a white color of a Macbeth chart.

8. The conductive film according to claim 1,
wherein the luminance image data of the images of the pixel array patterns of the respective colors of the plurality of colors is obtained by giving the luminance data in which a measured luminance value is normalized through a product between a resolution of the display unit and an area having a value of a mask image, where the mask image is created from the captured image data which is obtained by capturing the image of the pixel array pattern of a current color displayed on the display screen of the display unit through a microscope, when the light beams of the respective colors of the plurality of colors are separately emitted in the display unit, and
wherein the luminance image data is obtained by normalizing a reference luminance of the display unit of the display device to 1.0.

9. The conductive film according to claim 8,
wherein when the plurality of colors is three colors such as red, green, and blue, the measured luminance value is a luminance value which is obtained from spectrum data of each color of red, green, and blue by separately performing display for each color of red, green, and blue and performing measurement through a spectrometer, and
wherein the mask image is an image that is obtained by binarizing the captured image data which is obtained through imaging of the microscope.

10. The conductive film according to claim 1, wherein the two wiring portions are respectively formed on both side surfaces of the transparent substrate.

11. The conductive film according to claim 1, further comprising a second transparent substrate that is different from a first transparent substrate when the transparent substrate is defined as the first transparent substrate,
wherein one wiring portion of the two wiring portions is formed on one surface of the first transparent substrate, and
wherein the other wiring portion of the two wiring portions is formed on one surface of the second transparent substrate, on the other surface side of the first transparent substrate.

12. The conductive film according to claim 1, wherein the two wiring portions are respectively formed with insulation layers interposed therebetween on single sides of the transparent substrates.

13. The conductive film according to claim 1, wherein all the plurality of thin metal lines of the two wiring portions constitutes the wavy wiring pattern.

14. The conductive film according to claim 1,
wherein the plurality of thin metal lines of one wiring portion of the two wiring portions constitutes the wavy wiring pattern, and wherein the plurality of thin metal lines of the other wiring portion constitutes a regular polygonal wiring pattern which allows the indicator of evaluation of moirés to be equal to or less than the evaluation threshold value.

15. The conductive film according to claim 1,
wherein at least one wiring portion of the two wiring portions includes an electrode portion and a non-electrode portion,
wherein the plurality of thin metal lines of one of the electrode portion and the non-electrode portion constitutes the wavy wiring pattern, and
wherein the plurality of thin metal lines of the other of the electrode portion and the non-electrode portion constitutes a regular polygonal wiring pattern which allows the indicator of evaluation of moirés to be equal to or less than the evaluation threshold value.

16. The conductive film according to claim 1,
wherein the plurality of thin metal lines of one wiring portion of the two wiring portions constitutes the wavy wiring pattern, and
wherein the other wiring portion is made of indium tin oxide.

17. The conductive film according to claim 1,
wherein the plurality of first spectrum peaks has a peak intensity that is equal to or greater than a first threshold value which is selected from a plurality of spectrum peaks obtained by performing two-dimensional Fourier transform on the transmittance image data of the wiring pattern, and
wherein for each of the plurality of colors, the plurality of second spectrum peaks has a peak intensity that is equal to or greater than a second threshold value which is selected from a plurality of spectrum peaks obtained by performing two-dimensional Fourier transform on the luminance image data of the pixel array pattern.

18. The conductive film according to claim 1,
wherein a frequency of a moiré corresponding to each color is given as a difference between the first peak frequency and the second peak frequency corresponding to each color, and
wherein an intensity of the moiré corresponding to each color is given as a product between the first peak intensity and the second peak intensity corresponding to each color.

19. The conductive film according to claim 1, wherein an evaluation value of the moiré is calculated by weighting a visual transfer function, which corresponds to the observation distance as the visual response characteristics, to the frequency and the intensity of the moiré through convolution integration.

20. The conductive film according to claim 19, wherein the visual transfer function VTF is given by the following Expression (1), $$\text{VTF} = 5.05 e^{-0.138\,k}(1 - e^{0.1\,k}) \quad (1), \text{ and}$$

$$k = \pi d u / 180,$$

where k is a spatial frequency (cycle/deg) defined by a solid angle, u shown in the above-mentioned Expression (1) is a spatial frequency (cycle/mm) defined by a length, and d is defined by an observation distance (mm).

21. The conductive film according to claim 1, wherein the indicator of evaluation of the moirés is calculated using a largest evaluation value among the evaluation values of the plurality of the moirés in which a frequency of one of the moirés is weighted in accordance with the observation distance for each color.

22. The conductive film according to claim 21, wherein the indicator of evaluation of the moirés is a largest sum among sums for the plurality of colors, the sums being obtained by adding the frequencies of all the moirés to the largest evaluation value selected with respect to the frequency of one of the moirés for each color.

23. The conductive film according to claim 1,
wherein the first intensity threshold value is −4.5 as a common logarithm, and the frequency threshold value is a spatial frequency which is obtained from the resolution of the display unit, and
wherein a moiré, which is selected in order to apply the visual response characteristics, has an intensity which is equal to or greater than −3.8.

24. The conductive film according to claim 23, wherein assuming that a display pixel pitch of the display unit is Pd μm, the spatial frequency obtained from the resolution of the display unit is a highest frequency of the moirés which is given as 1000/Pd cycle/mm.

25. The conductive film according to claim 1,
wherein from at least two points of view of front observation and oblique observation, the evaluation value is obtained for each color of the plurality of colors, and
wherein the indicator of evaluation is a largest evaluation value among evaluation values of respective colors obtained in the at least two points of view.

26. The conductive film according to claim 1, wherein the pixel array patterns are black matrix patterns.

27. A display device comprising:
a display unit in which pixels, which include a plurality of sub-pixels emitting light with a plurality of colors that are different from each other, are arranged in pixel array patterns which are repeated in a certain direction and a direction perpendicular to the certain direction; and
the conductive film according to claim 1, the conductive film being provided on the display unit.

28. A method of evaluating a conductive film that is provided on a display unit of a display device and has two wiring portions which are formed on both sides or a single side of the transparent substrate, the method comprising:
providing a plurality of thin metal lines on at least one wiring portion of the two wiring portions;
causing the plurality of thin metal lines of at least one wiring portion of the two wiring portions to have a wiring pattern which is formed of wavy lines so as to have irregularity;
causing the plurality of thin metal lines or center lines of the wavy lines to have a polygonal wiring pattern formed in a mesh shape, and arranging a plurality of polygonal opening portions in the wiring portion;
arranging pixels, which include a plurality of sub-pixels emitting light with a plurality of colors that are at least three colors different from each other, in pixel array patterns, in the display unit;
providing the conductive film on the display unit such that the wiring patterns of the two wiring portions overlap with the pixel array patterns of the display unit;
acquiring transmittance image data of a regular polygonal wiring pattern, which is not made to be irregular, and luminance image data of the pixel array patterns of respective colors of the plurality of colors of the display unit when light beams with the plurality of colors are respectively emitted, from at least one point of view;

calculating a first peak frequency and a first peak intensity of a plurality of first spectrum peaks of two-dimensional Fourier spectra of transmittance image data of the regular polygonal wiring pattern and a second peak frequency and a second peak intensity of a plurality of second spectrum peaks of two-dimensional Fourier spectra of luminance image data of the pixel array patterns of the respective colors of the plurality of colors, for each color, by performing two-dimensional Fourier transform on the transmittance image data of the regular polygonal wiring pattern and the luminance image data of the pixel array pattern;

calculating frequencies and intensities of moirés of the respective colors of the plurality of colors from the first peak frequency and the first peak intensity of the wiring pattern and the second peak frequency and the second peak intensity of the sub-pixel array patterns of the respective plurality of colors calculated in the above-mentioned manner, selecting moirés having frequencies equal to or less than a frequency threshold value and intensities equal to or greater than a first intensity threshold value defined on the basis of a display resolution of the display unit, among the frequencies and intensities of the moirés of the respective colors calculated in the above-mentioned manner;

acquiring evaluation values of moirés of the respective colors by applying human visual response characteristics in accordance with an observation distance to the intensities of moirés at respective frequencies of moirés of the respective colors selected in the above-mentioned manner;

calculating an indicator of evaluation of the moirés from the evaluation values of the moirés of the respective colors acquired in the above-mentioned manner, acquiring regular polygonal wiring patterns which allows the indicator of evaluation of moirés calculated in the above-mentioned manner to be equal to or less than a predetermined value; and evaluating the conductive film that has a wavy wiring pattern in which the plurality of thin metal lines, which form the acquired regular polygonal wiring pattern having the indicator of evaluation of moirés equal to or less than the predetermined value, is formed as the wavy lines of which amplitudes are equal to or less than an amplitude threshold value.

* * * * *